(12) United States Patent
Ohtsuka et al.

(10) Patent No.: US 10,847,848 B2
(45) Date of Patent: Nov. 24, 2020

(54) ELECTRONIC DEVICE, ELECTRONIC SYSTEM, AND METHOD FOR SWITCHING BATTERY USED IN ELECTRONIC DEVICE

(71) Applicant: Panasonic Intellectual Property Management Co., Ltd., Osaka (JP)

(72) Inventors: Yoshio Ohtsuka, Osaka (JP); Yasuhiro Ogata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 71 days.

(21) Appl. No.: 16/277,649

(22) Filed: Feb. 15, 2019

(65) Prior Publication Data

US 2019/0181509 A1 Jun. 13, 2019

Related U.S. Application Data

(63) Continuation of application No. PCT/JP2018/026443, filed on Jul. 13, 2018.

(30) Foreign Application Priority Data

Jul. 19, 2017 (JP) ................................. 2017-140331
Apr. 11, 2018 (WO) .................. PCT/JP2018/015189

(51) Int. Cl.
| | | |
|---|---|---|
| *H01M 10/44* | (2006.01) | |
| *G03B 7/26* | (2006.01) | |
| *H01M 10/48* | (2006.01) | |
| *H02J 7/00* | (2006.01) | |
| *H04N 5/232* | (2006.01) | |
| *H02J 9/06* | (2006.01) | |
| *H01M 10/42* | (2006.01) | |
| *G03B 17/02* | (2006.01) | |

(52) U.S. Cl.
CPC ............ *H01M 10/441* (2013.01); *G03B 7/26* (2013.01); *H01M 10/425* (2013.01);
(Continued)

(58) Field of Classification Search
CPC .. H01M 10/441; H01M 10/425; H01M 10/44; H01M 10/48; H02J 7/00
(Continued)

(56) References Cited

U.S. PATENT DOCUMENTS

2005/0162132 A1* 7/2005 Nagasawa ............... H02J 9/061
320/128
2008/0315840 A1 12/2008 Mori et al.
(Continued)

FOREIGN PATENT DOCUMENTS

| JP | 10-143290 | 5/1998 |
|---|---|---|
| JP | 10-260752 | 9/1998 |

(Continued)

OTHER PUBLICATIONS

The Extended European Search Report dated Aug. 26, 2019 for the related European Patent Application No. 18835999.6.
(Continued)

*Primary Examiner* — Edward Tso
*Assistant Examiner* — Aaron Piggush
(74) *Attorney, Agent, or Firm* — Renner, Otto, Boisselle & Sklar, LLP

(57) ABSTRACT

In electronic device (102) of the present disclosure, control circuit (153) selects one of first battery (201) and second battery (202) of extension device (103), and causes selected one to supply electric power to a load circuit. Control circuit (153) detects which state of switch (171) is in a first state or a second state. Control circuit (153) preferentially selects first battery (201) as a supply source of electric power to the load circuit as compared with second battery (202) when switch (171) is in the first state.

15 Claims, 13 Drawing Sheets

(52) U.S. Cl.
CPC ........... *H01M 10/44* (2013.01); *H01M 10/48* (2013.01); *H02J 7/00* (2013.01); *H02J 9/06* (2013.01); *H04N 5/23241* (2013.01); *G03B 17/02* (2013.01); *H01M 2010/4271* (2013.01); *H01M 2220/30* (2013.01)

(58) Field of Classification Search
USPC .............................. 320/114, 132, 134, 163
See application file for complete search history.

(56) References Cited

U.S. PATENT DOCUMENTS

| | | | | |
|---|---|---|---|---|
| 2009/0284225 | A1* | 11/2009 | Nakanuma | H01M 10/441 320/134 |
| 2013/0272691 | A1 | 10/2013 | Yamaguchi | |
| 2019/0280516 | A1* | 9/2019 | Shimaya | H02J 9/06 |

FOREIGN PATENT DOCUMENTS

| | | |
|---|---|---|
| JP | 2005-237189 | 9/2005 |
| JP | 2010-128295 | 6/2010 |
| JP | 2010-243696 | 10/2010 |
| JP | 2011-227753 | 11/2011 |
| JP | 2013-240267 | 11/2013 |
| JP | 2017-153210 | 8/2017 |

OTHER PUBLICATIONS

International Search Report of PCT application No. PCT/JP2018/015189 dated May 15, 2018.

International Search Report of PCT application No. PCT/JP2018/026443 dated Oct. 2, 2018.

\* cited by examiner

FIG. 16

| | STATE DETECTOR | RESTRICTION MECHANISM | MOUNTING STATE | | TAKING OUT PROCEEDING STATE | | REMARK |
|---|---|---|---|---|---|---|---|
| | | | STATE DETECTOR | RESTRICTION MECHANISM | STATE DETECTOR | RESTRICTION MECHANISM | |
| THIRD EXEMPLARY EMBODIMENT | SWITCH 184 | BATTERY DOOR 180 LOCK LEVER 181 | SWITCH 184: ON | BATTERY DOOR 180: CLOSED LOCK LEVER 181: CLOSED | SWITCH 184: OFF | BATTERY DOOR 180: OPEN LOCK LEVER 181: OPEN | BATTERY DOOR 180 IS AUTOMATICALLY OPENED AND CLOSED BY TORSION COIL SPRING |
| FIRST MODIFICATION | SIMILARLY TO THIRD EXEMPLARY EMBODIMENT | SIMILARLY TO THIRD EXEMPLARY EMBODIMENT | SIMILARLY TO THIRD EXEMPLARY EMBODIMENT | SIMILARLY TO THIRD EXEMPLARY EMBODIMENT | SIMILARLY TO THIRD EXEMPLARY EMBODIMENT | SIMILARLY TO THIRD EXEMPLARY EMBODIMENT | BATTERY DOOR 180 IS ELECTRICALLY OPENED AND CLOSED |
| SECOND MODIFICATION | SIMILARLY TO THIRD EXEMPLARY EMBODIMENT | SIMILARLY TO THIRD EXEMPLARY EMBODIMENT | SIMILARLY TO THIRD EXEMPLARY EMBODIMENT | SIMILARLY TO THIRD EXEMPLARY EMBODIMENT | SIMILARLY TO THIRD EXEMPLARY EMBODIMENT | BATTERY DOOR 180: CLOSED LOCK LEVER 181: OPEN | BATTERY DOOR 180 IS MANUALLY OPENED AND CLOSED |
| THIRD MODIFICATION | SWITCH (OR SENSOR) | STOPPER SUCH AS CLAW | SWITCH: ON (OFF) | CLAW: ENGAGED | SWITCH: OFF (ON) | CLAW: ENGAGEMENT IS RELEASED | |
| FOURTH MODIFICATION | SWITCH 185 (OR SENSOR) | BATTERY DOOR 180 | SWITCH 185: ON | BATTERY DOOR 180: CLOSED | SWITCH: OFF | BATTERY DOOR 180: OPEN | |
| FIFTH MODIFICATION | SWITCH 185 (OR SENSOR) | SIMILARLY TO THIRD EXEMPLARY EMBODIMENT | SWITCH 185: ON | BATTERY DOOR 180: CLOSED | SWITCH: OFF | BATTERY DOOR 180: OPEN | |

ELECTRONIC DEVICE, ELECTRONIC SYSTEM, AND METHOD FOR SWITCHING BATTERY USED IN ELECTRONIC DEVICE

TECHNICAL FIELD

The present disclosure relates to an electronic device including a first battery, the electronic device being configured such that an extension device including a second battery is detachably attached to the electronic device. The present disclosure also relates to an electronic system including the electronic device and the extension device. The present disclosure also relates to a method for switching a battery used in the electronic device.

BACKGROUND ART

An electronic system of Unexamined Japanese Patent Publication No. 2013-240267 includes an electronic device and an extension device. The electronic device includes a first battery. The extension device includes a second battery, and is detachably attached to the electronic device. The electronic system selectively supplies electric power from the first battery or the second battery to a load circuit. For example, in the case that the electronic device is a digital camera, sometimes the extension device is referred to as a "battery grip (BG)".

In the case that the electronic system includes a plurality of batteries, priority of use may be given to each battery. The electronic system supplies electric power from the battery having the higher priority to the load circuit. When remaining electric energy of the battery in use becomes less than a predetermined threshold, the electronic system supplies electric power from the battery having the lower priority to the load circuit. For example, the priority of use of each battery may be set through a setting menu displayed on a display device of the electronic device. As described above, the electronic system includes the plurality of batteries, which allows an operating time of the electronic system to be lengthened.

SUMMARY OF THE INVENTION

An electronic device, an electronic system, and a method for switching a battery used in the electronic device of the present disclosure improve convenience of a user.

An electronic device according to a first aspect of the present disclosure is an electronic device including a first battery. An extension device including a second battery is detachably coupled to the electronic device.

The electronic device includes a load circuit and a control circuit. The load circuit activates the electronic device. The control circuit selects one of the first battery and the second battery, and causes the selected one to supply electric power to the load circuit.

The control circuit detects whether a switch provided in one of the electronic device and the extension device is in a first state or in a second state. The control circuit preferentially selects the first battery as a supply source of the electric power to the load circuit as compared with the second battery when the switch is in the first state.

An electronic device according to a second aspect of the present disclosure is an electronic device including a first battery. An extension device including a second battery is detachably coupled to the electronic device. The electronic device communicates with a state detector that detects a state of the second battery.

The second battery has a mounting state in which the second battery is mounted on the extension device and a taking out proceeding state in which the second battery transitions from the mounting state toward taking out.

Output of the state detector indicates one state when the second battery is in the mounting state, and indicates another state when the second battery is in the taking out proceeding state.

The electronic device includes a load circuit that activates the electronic device and a control circuit that selects one of the first battery and the second battery and causes the selected one to supply electric power to the load circuit.

The control circuit detects whether the second battery is in the mounting state or in the taking out proceeding state based on the output of the state detector. The control circuit preferentially selects the first battery as a supply source of the electric power to the load circuit as compared with the second battery when the second battery is in the taking out proceeding state while being preferentially used as compared with the first battery.

A third aspect of the present disclosure is a method for switching a battery used in an electronic device.

The electronic device includes a first battery. An extension device including a second battery is detachably attached to the electronic device. The electronic device communicates with a state detector that detects a state of the second battery.

The second battery has a mounting state in which the second battery is mounted on the extension device and a taking out proceeding state in which the second battery transitions from the mounting state toward taking out, Output of the state detector indicates one state when the second battery is in the mounting state, and indicates the other state when the second battery is in the taking out proceeding state.

In the battery switching method, the first battery is preferentially used as compared with the second battery when the second battery is in the taking out proceeding state while being preferentially used as compared with the first battery.

An electronic system according to a fourth aspect of the present disclosure includes the electronic device and the extension device including the second battery.

BRIEF DESCRIPTION OF DRAWINGS

FIG. 16 is a view illustrating a modification of the third exemplary embodiment.

DESCRIPTION OF EMBODIMENTS

Figure 1:
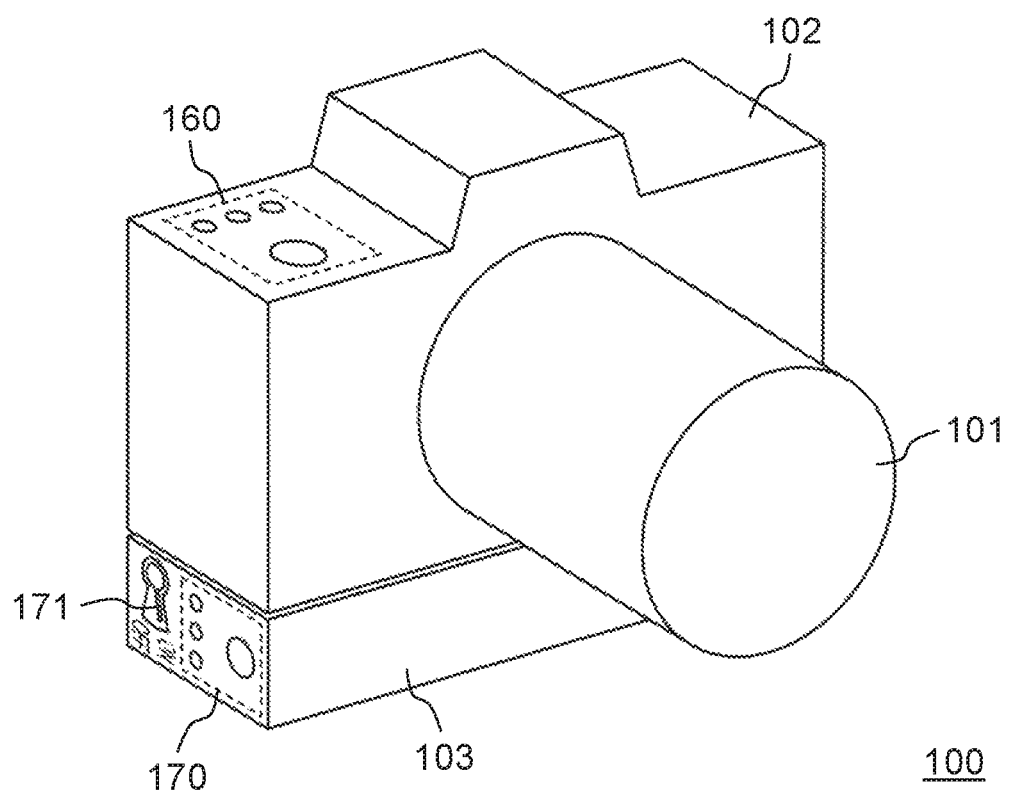
FIG. 1 is a perspective view illustrating an appearance of camera system 100 according to a first exemplary embodiment.

Knowledge based on the present disclosure will be described.

Sometimes the electronic system is required to be activated for a long time exceeding a time one battery can supply the electric power. For example, in the case that the electronic system is a digital camera, sometimes the digital camera is required to be activated for a very long time in an interview or capturing of a moving image of a wild animal. Electric power consumption increases in the case that a still image or a moving image of high resolution such as 4K and 6K or a moving image of a high frame rate of about 60 p is captured. Thus, the time for which the electric power can be supplied by one battery is relatively shortened.

In order to activate the digital camera for a long time, conventionally the extension device is attached to a main body device of the digital camera including a main battery. The extension device is also referred to as a battery grip (BG). The extension device includes an auxiliary battery.

In order to activate the digital camera for a further long time, it is considered that the main battery or auxiliary battery having small remaining electric energy is exchanged for a fully-charged battery.

In exchanging the battery, when the currently-used battery is taken out from the digital camera, the supply of the electric power to the load circuit is interrupted, there is a risk that the action of the digital camera is stopped. Thus, it is necessary for a user to perform a predetermined setting before taking out the battery from the digital camera. For example, the predetermined setting is input through a setting menu. The predetermined setting is a setting in which the electric power is supplied to the load circuit from a battery different from the battery to be taken out.

It is also necessary for the user to further perform a predetermined setting after attaching the battery to the digital camera. For example, the predetermined setting is input through the setting menu. The predetermined setting is a setting in which the electric power is supplied from a new battery to the load circuit.

In the case that the digital camera includes the main battery and the auxiliary battery, a priority (that is, use order of the battery) to use each battery is set. For example, the priority is set through the setting menu displayed on a display device of the digital camera.

A procedure to mount the main battery and the auxiliary battery before the capturing of the moving image, to exchange the auxiliary battery during the image capturing, and to accomplish the exchange will be described below.

(1) The use mounts the fully-charged battery (main battery) on the main body device.

(2) The user mounts the fully-charged battery (auxiliary battery) on the extension device.

(3) The user prepares some more fully-charged batteries.

(4) It is assumed that the battery use order is set to "auxiliary battery priority" as default, and that the battery is used from the battery of the extension device.

(5) When the remaining electric energy of the battery of the extension device becomes less than a predetermined threshold, the user changes the battery use order to "main battery priority" through the setting menu.

(6) The user exchanges the battery of the extension device for another fully-charged battery.

(7) The user changes the battery use order to "auxiliary battery priority" through the setting menu.

When performing the step (5), the user is required to perform the operation through the setting menu, and the operation is complicated. However, the step (6) is performed while the operation is omitted, the supply of the electric power from the battery is instantly stopped to interrupt recording of the moving image. In the case that the user does not perform the step (7), the digital camera does not return to the state in which the battery of the extension device is used.

In this way, it is necessary for the user to often operate the setting menu during the exchange of the battery, and the operation becomes troublesome. Thus, the present disclosure provides an electronic device and an electronic system, which improve convenience of the user during the exchange of the battery.

Hereinafter, exemplary embodiments will be described in detail with reference to the drawings as appropriate. However, detailed descriptions that are more than necessary may be omitted. For example, detailed description of well-known matters and repeated description of substantially the same structure may be omitted. Such omissions are for avoiding unnecessary redundancy in the following description and for facilitating understanding by those skilled in the art. It should be noted that the attached drawings and the following description are provided, by the inventor, for those skilled in the art to fully understand the present disclosure, and are not intended to limit the subject matter described in the claims.

1. First Exemplary Embodiment

A camera system according to a first exemplary embodiment will be described below with reference to FIGS. 1 to 10.

[1-1-1. Entire Configuration]

Figure 2:
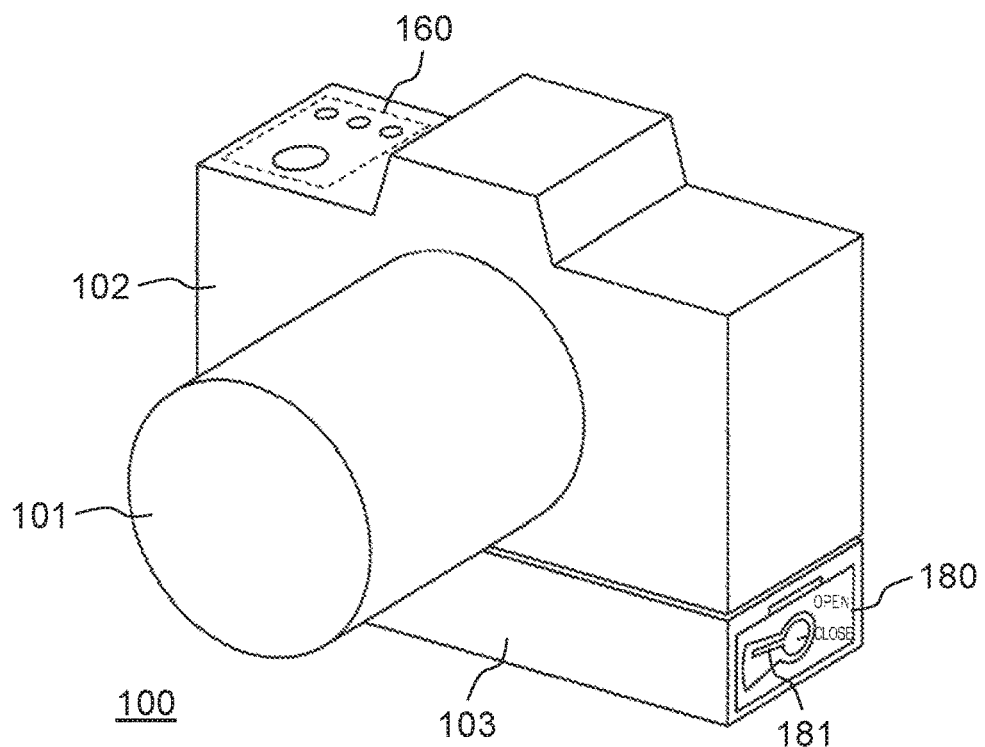
FIG. 2 is a perspective view illustrating the appearance of camera system 100 in FIG. 1 when camera system 100 is viewed from a different position from the case in FIG. 1.

FIG. 1 is a perspective view illustrating an appearance of camera system 100 of the first exemplary embodiment. FIG. 2 is a perspective view illustrating an appearance of camera system 100 in FIG. 1 when camera system 100 is viewed from a different position from the case in FIG. 1.

Camera system 100 includes main body device 102, interchangeable lens 101 that is detachably attached to main body device 102, and battery grip 103 that is detachably attached to main body device 102. Main body device 102 is a digital camera.

As illustrated in FIG. 1, main body device 102 includes operation unit 160 that operates main body device 102. Operation unit 160 of main body device 102 includes at least one of a release button, other buttons, a cross-key, a touch panel, and a dial. Battery grip 103 includes operation unit 170 and battery grip (BG) enabling switch 171. Operation unit 170 is used to operate main body device 102. BG enabling switch 171 is used to a function of operation unit 170 to validity or invalidity. Operation unit 170 includes at least one of a release button, other buttons, a cross-key, a touch panel, and a dial. Operation unit 170 of battery grip 103 receives the same operation as one having a higher use frequency among the button and the like of operation unit 160 of main body device 102 Operation unit 170 of battery grip 103 receives user's operation only when BG enabling switch 171 is in a second state (for example, on). Operation unit 170 does not receive user's operation when BG enabling switch 171 is in a first state (for example, off).

Figure 3:
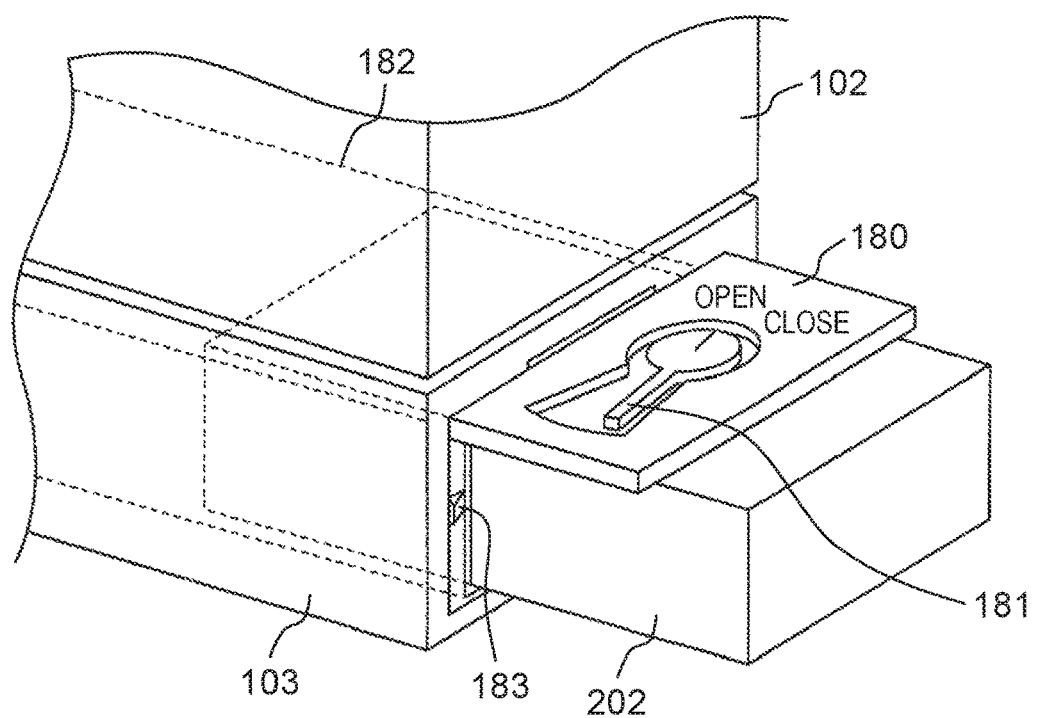
FIG. 3 is a perspective view illustrating a state of battery grip 103 in FIG. 2 when auxiliary battery 202 is attached to and detached from battery grip 103.

Main body device 102 includes a detachably-attached main battery. Extension device 103 includes a detachably-attached auxiliary battery. FIG. 3 is a perspective view illustrating a state of battery grip 103 in FIG. 2 when auxiliary battery 202 is attached to and detached from battery grip 103. Battery grip 103 includes battery door 180, lock lever 181, accommodation chamber 182, and claw 183.

Accommodation chamber 182 accommodates auxiliary battery 202 therein. Claw 183 is configured to be extendable toward accommodation chamber 182 by a spring. When auxiliary battery 202 is attached to and detached from accommodation chamber 182, claw 183 is pushed down by the user so as not to disturb movement of auxiliary battery 202. When auxiliary battery 202 is accommodated in accommodation chamber 182, claw 183 protrudes inward. Consequently, a part of claw 183 is located on a casing of auxiliary battery 202, and auxiliary battery 202 is hardly dropped from accommodation chamber 182.

Battery door 180 openably covers accommodation chamber 182. When battery door 180 is closed, lock lever 181 is set to "closed" to lock battery door 180. That is, when lock lever 181 is in "closed", auxiliary battery 202 is fixed to battery grip 103. On the other hand, when lock lever 181 is set to "open", the user can open battery door 180. That is, when lock lever 181 is in "open", the user can take out auxiliary battery 202 from battery grip 103.

Figure 4:
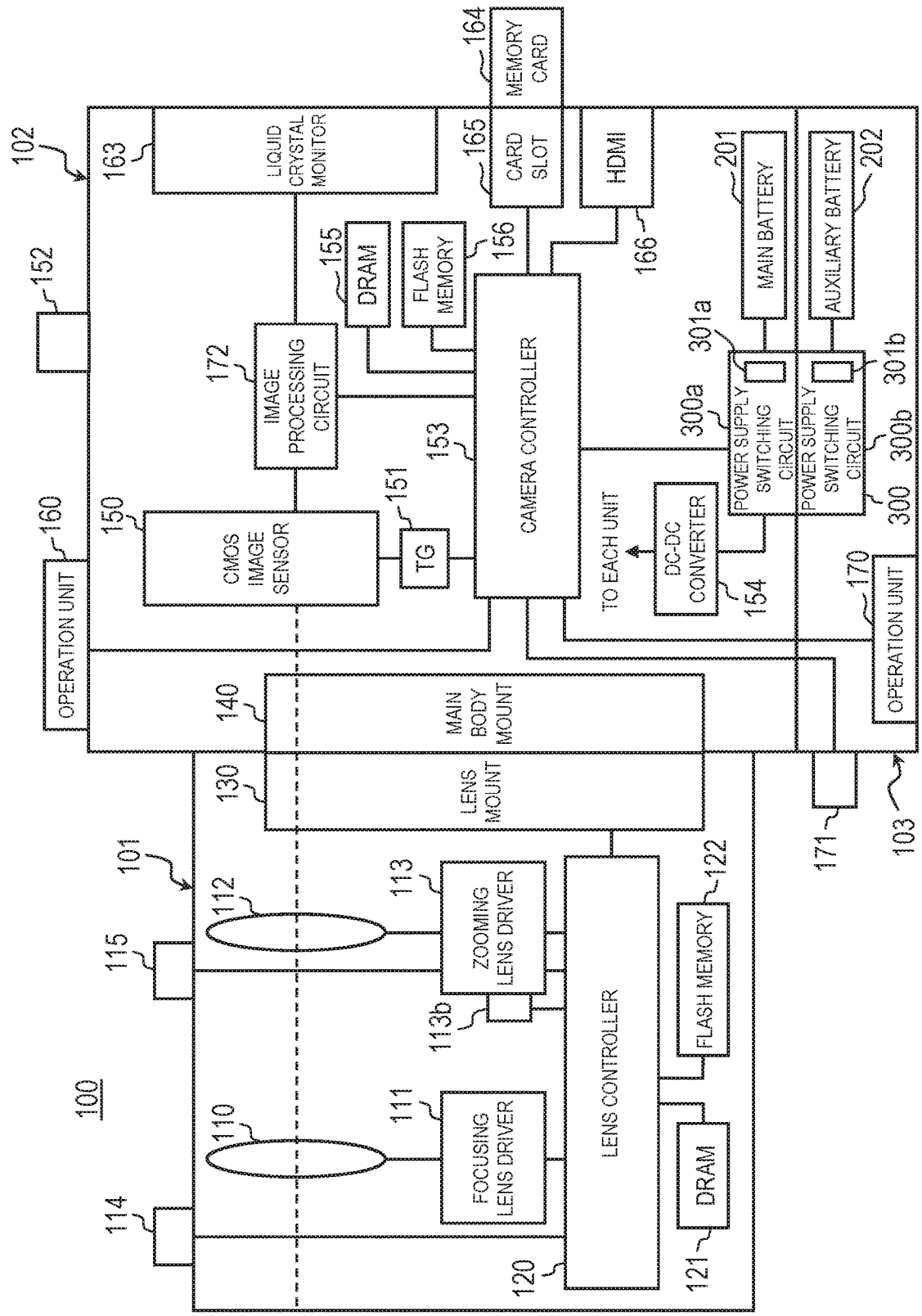
FIG. 4 is a block diagram illustrating a configuration of camera system 100 in FIG. 1.

FIG. 4 is a block diagram illustrating a configuration of camera system 100 in FIG. 1. Configurations of interchangeable lens 101, main body device 102, and battery grip 103 will be described below with reference to FIG. 4.

[1-1-2. Configuration of Interchangeable Lens 101]

Interchangeable lens 101 includes focusing lens 110, focusing lens driver 111, zooming lens 112, zooming lens driver 113, focusing ring 114, zooming ring 115, lens controller 120, DRAM (Dynamic Random Access Memory) 121, flash memory 122, and lens mount 130.

Interchangeable lens 101 is detachably attached to main body device 102 with lens mount 130 interposed therebetween.

Lens controller 120 control whole action of interchangeable lens 101. DRAM 121 is used as a working memory by lens controller 120. Flash memory 122 retains a program, a parameter, and lens data, which are used by lens controller 120. The lens data includes characteristic values, such as a lens name, a lens ID, a serial number, an F number, and a focal distance, which are unique to interchangeable lens 101. Lens controller 120 notifies main body device 102 of the lens data, and main body device 102 performs various kinds of control according to the lens data.

Focusing lens 110 has a function of changing a focus state of a subject image, which is incident from interchangeable lens 101 onto main body device 102 and is formed on an image sensor of main body device 102. Any number of focusing lenses 110 is given. Any number of lens groups included in focusing lens 110 is given. Focusing ring 114 is operated by the user, and lens controller 120 is notified of control input of focusing ring 114. Lens controller 120 controls focusing lens driver 111 such that focusing lens 110 advances and retreats along an optical axis of an optical system based on the control input of focusing ring 114. Focusing lens driver 111 drives focusing lens 110 based on a signal from lens controller 120.

Zooming lens 112 has a function of changing magnification of the subject image. Any number of zooming lenses 112 is given. Any number of lens groups included in zooming lens 112 is given. Zooming ring 115 is operated by the user, and zooming lens driver 113 is notified of the control input of zooming ring 115. Zooming lens driver 113 moves zooming lens 112 along the optical axis of the optical system based on the control input of zooming ring 115. A position of zooming lens 112 is detected at all times by zooming lens position detector 113b, and lens controller 120 is notified of the position of zooming lens 112.

Focusing lens 110 and zooming lens 112 may be driven under the control of main body device 102 instead of being driven according to the control input of focusing ring 114 and zooming ring 115.

[1-1-3. Configuration of main body device 102]

Main body device 102 includes main body mount 140, Complementary Metal Oxide Semiconductor (CMOS) image sensor 150, timing generator (TG) 151, power switch 152, camera controller 153, DC-DC converter 154, DRAM 155, flash memory 156, operation unit 160, liquid crystal monitor 163, card slot 165, High-Definition Multimedia Interface (HDMI) (registered trademark) interface 166, image processing circuit 172, main battery 201, and power supply switching circuit 300a.

As described above, operation unit 160 includes a release button, other buttons, a cross-key, a touch panel, and a dial.

Lens mount 130 of interchangeable lens 101 and main body mount 140 of main body device 102 are mechanically and electrically connected to each other. This connection detachably attaches interchangeable lens 101 to main body device 102. Main body mount 140 transmits and receives data between main body device 102 and interchangeable lens 101 through lens mount 130. Main body mount 140 transmits an exposure synchronizing signal and other control signals, which are received from camera controller 153, to lens controller 120 through lens mount 130. Main body mount 140 also transmits a signal received from lens controller 120 to camera controller 153 through lens mount 130.

In response to an instruction from operation unit 160, camera controller 153 controls whole action of camera system 100 including image processing action and other control actions. DRAM 155 is used as a working memory by camera controller 153. Flash memory 156 retains image data. Flash memory 156 retains a program and a parameter, which are used by camera controller 153. Camera controller 153 transmits a vertical synchronizing signal to timing generator 151, and generates an exposure synchronizing signal in parallel with this based on the vertical synchronizing signal. Camera controller 153 periodically and repeatedly transmits the generated exposure synchronizing signal to lens controller 120 through main body mount 140 and lens mount 130. Consequently, camera controller 153 controls lenses such as focusing lens 110 in interchangeable lens 101 so as to be synchronized with exposure timing.

CMOS image sensor 150 includes a light receiving element, an automatic gain control circuit, and an analog-digital converter. Light receiving element converts an optical signal concentrated by interchangeable lens 101 into an electric signal, and outputs the electric signal. The automatic gain control circuit amplifies and outputs the electric signal output from the light receiving element. The analog-digital converter converts the electric signal output from the automatic gain control circuit into a digital signal, and outputs the digital signal. CMOS image sensor 150 is activated in synchronization with a timing signal controlled by timing generator 151. The actions of CMOS image sensor 150 controlled by timing generator 151 include imaging action of a still image and a moving image, imaging action of a through image, data transfer action, and electronic shutter action. The through image is mainly a moving image, is used to decide composition of the captured still image by the user, and is displayed on liquid crystal monitor 163. The image data generated by CMOS image sensor 150 is transmitted to image processing circuit 172.

Image processing circuit 172 perform predetermined image processing on the image data output from CMOS image sensor 150. The predetermined image processing includes gamma correction processing, white balance correction processing, flaw correction processing, YC converting processing, digital zooming processing, compression processing, and expansion processing, but is not limited thereto.

Liquid crystal monitor 163 is a display device disposed on a back surface of main body device 102. Liquid crystal monitor 163 displays the image data (for example, a still image or a moving image) processed by image processing circuit 172. Liquid crystal monitor 163 displays a setting menu. The setting menu is various action conditions of camera system 100. Liquid crystal monitor 163 may include a touch panel that functions as a part of operation unit 160.

Card slot 165 electrically and mechanically connects memory card 164 to main body device 102. Memory card 164 is an external storage medium detachably attached to card slot 165. Memory card 164 includes a storage element such as a flash memory. Camera controller 153 stores image data captured by camera system 100 in memory card 164. Main body device 102 may include a plurality of card slots in order to capture the moving image for a long stretch of time. In this case, in order to capture the moving image for a further long stretch of time, the user may exchange a memory card having a small free space for a memory card having a large free space while capturing the image. Camera controller 153 reads the image data stored in memory card 164. Camera controller 153 and image processing circuit 172 process the read image data. Camera controller 153 displays the image based on the processed image data on liquid crystal monitor 163.

HDMI interface 166 outputs the image data captured by camera system 100 to an external storage device such as a hard disk recorder.

Main battery 201 supplies electric power to the load circuit that activates camera system 100. Main battery 201 may be a primary battery or a secondary battery. Main battery 201 may detachably be attached to main body device 102, or may be attached to main body device 102 so as not to be taken out.

Power supply switching circuit 300a constitutes power supply switching circuit 300 of camera system 100 together with power supply switching circuit 300b (to be described later) of battery grip 103. Under the control of camera controller 153, power supply switching circuit 300 selects one of main battery 201 of main body device 102 and auxiliary battery 202 of battery grip 103 as a power supply for camera system 100. Power supply switching circuit 300 outputs the electric power of the selected battery to DC-DC converter 154. Power supply switching circuit 300a includes watt-hour meter 301a. Watt-hour meter 301a acquires a measurement value corresponding to the remaining electric energy of main battery 201. For example, the measurement value may be acquired as voltage associated with voltage between both ends of main battery 201. Power supply switching circuit 300 notifies camera controller 153 of the measurement value of watt-hour meter 301a.

DC-DC converter 154 supplies the electric power from power supply switching circuit 300 (that is, the electric power from main battery 201 or auxiliary battery 202) to the load circuit of each unit of camera system 100. The load circuit is a circuit of camera system 100 that is activated by receiving the supply of the electric power from main battery 201 or auxiliary battery 202. Load circuit includes CMOS image sensor 150, timing generator 151, camera controller 153, DRAM 155, flash memory 156, liquid crystal monitor 163, card slot 165, HDMI interface 166, and image processing circuit 172 of main body device 102 and components of interchangeable lens 101. DC-DC converter 154 converts voltage supplied from the battery into voltage suitable for the load circuit of each unit in order to supply the electric power to the load circuit of each unit.

Power of camera system 100 is turned on and off by power switch 152. When camera system 100 is powered on, camera controller 153 supplies electric power to each unit of main body device 102. Camera controller 153 also supplies the electric power to interchangeable lens 101 through main body mount 140 and lens mount 130.

Other imaging element such as an N-channel Metal Oxide Semiconductor (NMOS) image sensor or a Charge Coupled Device (CCD) image sensor may be used instead of CMOS image sensor 150.

Other display devices such as an organic Electro Luminescence (EL) display may be used instead of liquid crystal monitor 163.

Other external recording mediums such as an optical disk may be used instead of memory card 164.

Camera controller 153 may be constructed with a hard-wired electronic circuit or a microcomputer that executes a program. Camera controller 153 may be constructed as an integrated circuit identical to or separate from image processing circuit 172 and DRAM 155.

[1-1-4. Configuration of Battery Grip 103]

Battery grip 103 includes operation unit 170, BG enabling switch 171, auxiliary battery 202, and power supply switching circuit 300b. For convenience, battery door 180, lock lever 181, and accommodation chamber 182 (see FIG. 3) are omitted in FIG. 4.

As described above, operation unit 170 includes a release button, other buttons, a cross-key, and a dial. As described above, BG enabling switch 171 enables or disables the function of operation unit 170 of battery grip 103. In the first exemplary embodiment, BG enabling switch 171 is a turning lever as illustrated in FIG. 1.

Auxiliary battery 202 supplies the electric power to the load circuit that activates camera system 100. Auxiliary battery 202 may be a primary battery or a secondary battery. Auxiliary battery 202 may be a type identical to or different from main battery 201.

Power supply switching circuit 300b constitutes power supply switching circuit 300 of camera system 100 together with power supply switching circuit 300a of main body device 102. Power supply switching circuit 300b includes watt-hour meter 301b. Watt-hour meter 301b acquires the measurement value corresponding to the remaining electric energy of auxiliary battery 202. For example, the measurement value may be acquired as the voltage associated with the voltage between both ends of auxiliary battery 202. Power supply switching circuit 300 notifies camera controller 153 of the measurement value of watt-hour meter 301*b*.

In the first exemplary embodiment, when battery grip 103 is attached to main body device 102, both power supply switching circuit 300*a* of main body device 102 and power supply switching circuit 300*b* of battery grip 103 constitute power supply switching circuit 300. Alternatively, power supply switching circuit 300 may be not divided but integrated. In this case, power supply switching circuit 300 may be provided only in one of main body device 102 and battery grip 103. In the case that integrated power supply switching circuit 300 is provided in main body device 102, watt-hour meter 301*b* for auxiliary battery 202 may be provided in either main body device 102 or battery grip 103.

[1-2. Action]

Camera controller 153 considers the state of BG enabling switch 171 and the measurement values of watt-hour meter 301*a*, 301*b* in order to selectively supply the electric power from one of main battery 201 and auxiliary battery 202 to the load circuit of each unit of camera system 100.

Camera system 100 has the following three modes. These modes having different workings when BG enabling switch 171 is operated.

(1) First mode: BG enabling switch 171 controls both operation unit 170 of battery grip 103 and auxiliary battery 202. That is, when the BG enabling switch 171 is turned on, the function of operation unit 170 of battery grip 103 is enabled, and auxiliary battery 202 is preferentially used as compared with main battery 201. When BG enabling switch 171 is turned off, the function of operation unit 170 of battery grip 103 is disabled, and main battery 201 is preferentially used as compared with auxiliary battery 202.

(2) Second mode: BG enabling switch 171 controls only auxiliary battery 202. That is, when BG enabling switch 171 is turned on, auxiliary battery 202 is preferentially used as compared with main battery 201. When BG enabling switch 171 is turned off, main battery 201 is preferentially used as compared with auxiliary battery 202. The validity or the invalidity of the function of operation unit 170 of battery grip 103 is not changed according to the state of BG enabling switch 171. The function of operation unit 170 of battery grip 103 is enabled or disabled through the setting menu.

(3) Third mode: BG enabling switch 171 controls only operation unit 170 of battery grip 103. That is, when BG enabling switch 171 is turned on, the function of operation unit 170 of battery grip 103 is enabled. When BG enabling switch 171 is turned off, the function of operation unit 170 of battery grip 103 is disabled. In main battery 201 and auxiliary battery 202, the preferentially-used battery is not changed according to the state of BG enabling switch 171. Which battery is preferentially used is set through the setting menu.

Figure 5:
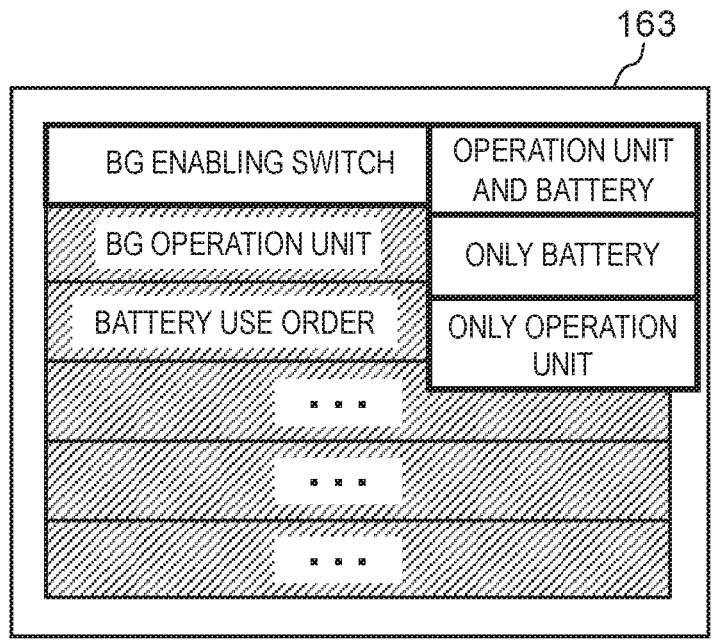
FIG. 5 is a view illustrating state A of a setting menu displayed on liquid crystal monitor 163 in FIG. 4.

FIG. 5 is a view illustrating state A of the setting menu displayed on liquid crystal monitor 163. The selection of one of the first mode (the operation unit and the battery), the second mode (only the battery), and the third mode (only the operation unit) of camera system 100 is received in an item of "BG enabling switch". The selection of the validity or the invalidity of the function of operation unit 170 of battery grip 103 is received in an item of "BG operation unit". The selection of the preferentially-used battery in main battery 201 and auxiliary battery 202 is received in an item of "battery use order". When the item of "BG enabling switch" is selected in the setting menu, camera system 100 is set to one of the first to third modes.

Figure 6:
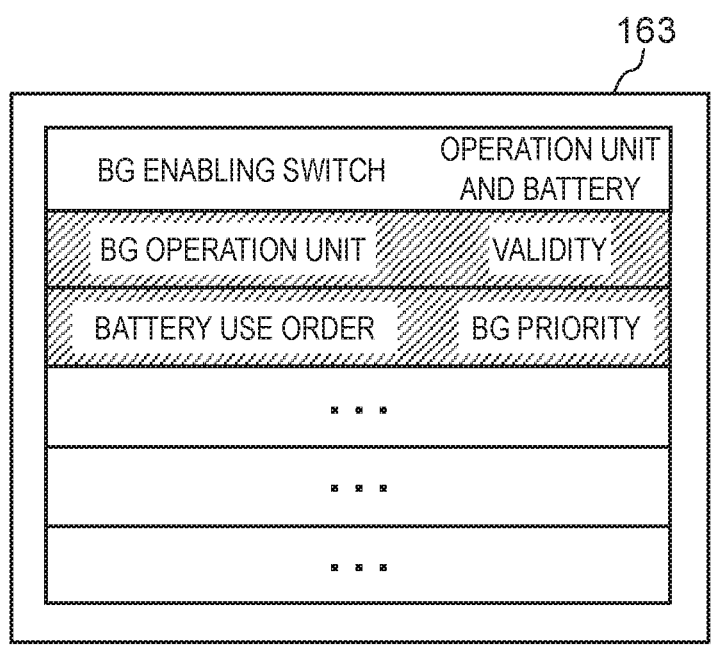
FIG. 6 is a view illustrating state B of the setting menu displayed on liquid crystal monitor 163 in FIG. 4.

FIG. 6 is a view illustrating state B of the setting menu displayed on liquid crystal monitor 163. FIG. 6 illustrates the state when the item of "BG enabling switch" is set to the first mode (the operation unit and the battery). In this case, the function of operation unit 170 of battery grip 103 and the preferentially-used battery are set according to the state of BG enabling switch 171. On the other hand, the settings of the items of "BG operation unit" and "battery use order" are not received in the setting menu of liquid crystal monitor 163.

Figure 7:
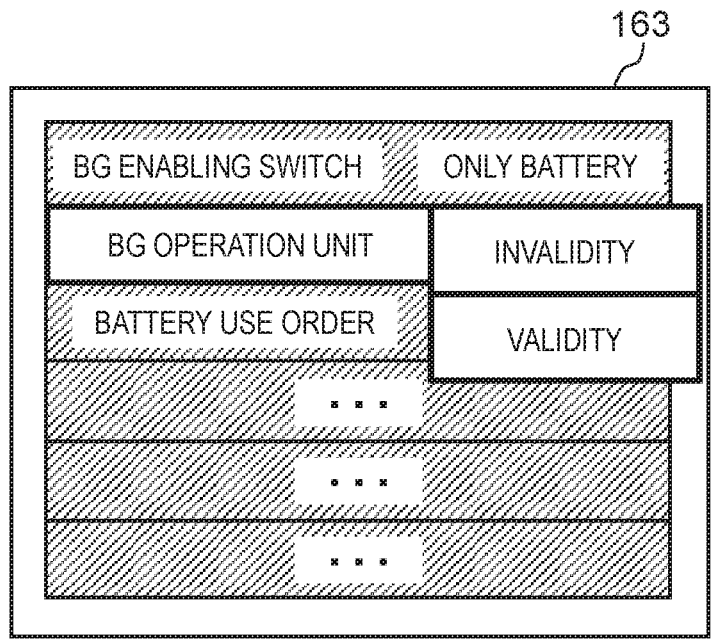
FIG. 7 is a view illustrating state C of the setting menu displayed on liquid crystal monitor 163 in FIG. 4.

FIG. 7 is a view illustrating state C of the setting menu displayed on liquid crystal monitor 163. FIG. 7 illustrates the state when the item of "BG enabling switch" is set to the second mode (only the battery). When the item of "BG operation unit" is selected in the setting menu, the function of operation unit 170 of battery grip 103 is enabled or disabled through the setting menu. On the other hand, the preferentially-used battery is set according to the state of BG enabling switch 171. Thus, the setting of the item of "battery use order" is not received in the setting menu of liquid crystal monitor 163.

Figure 8:
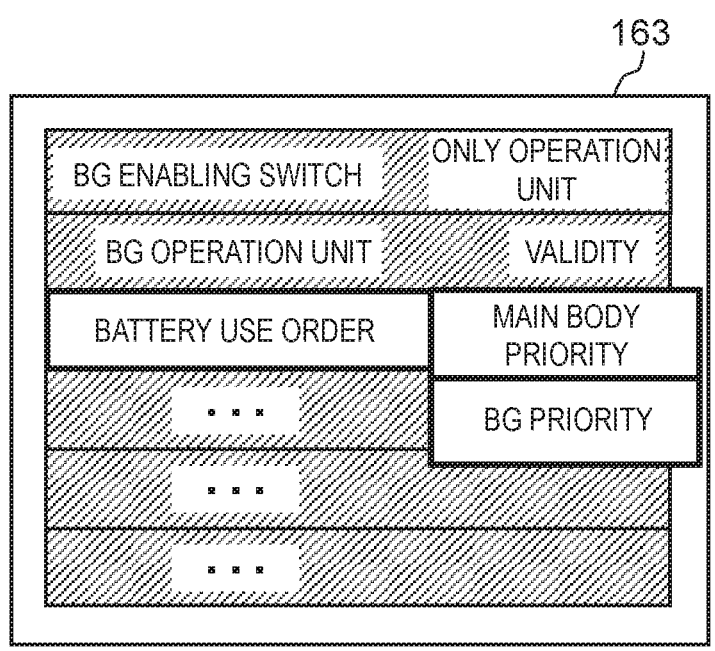
FIG. 8 is a view illustrating state D of the setting menu displayed on liquid crystal monitor 163 in FIG. 4.

FIG. 8 is a view illustrating state D of the setting menu displayed on liquid crystal monitor 163. FIG. 8 illustrates the state when the item of "BG enabling switch" is set to the third mode (only the operation unit). When the item of "battery use order" is selected in the setting menu, the preferentially-used battery in main battery 201 and auxiliary battery 202 is set through the setting menu. "Main body priority" indicates that main battery 201 of main body device 102 is preferentially used. "BG priority" indicates that auxiliary battery 202 of battery grip 103 is preferentially used. On the other hand, the function of operation unit 170 of battery grip 103 is enabled or disabled according to the state of BG enabling switch 171. Thus, the setting of the item of "BG operation unit" is not received in the setting menu of liquid crystal monitor 163.

Figure 9:
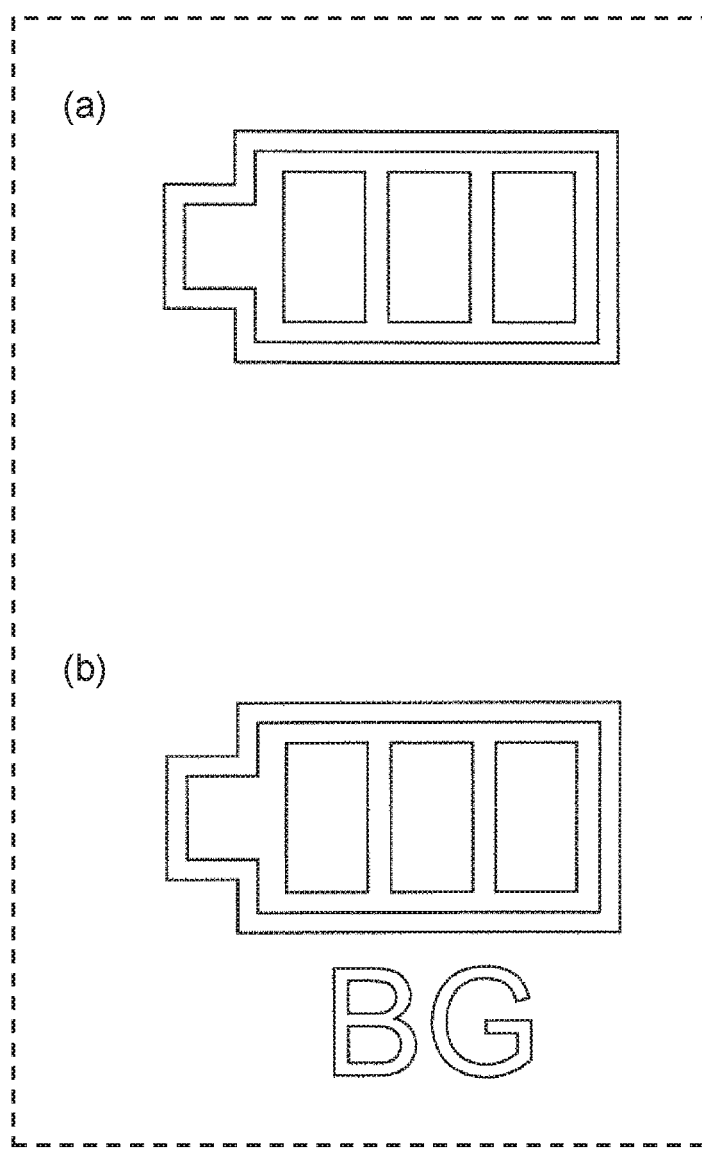
FIG. 9 is a view illustrating an icon indicating remaining electric energy. Part (a) of FIG. 9 is a view illustrating an icon indicating remaining electric energy of main battery 201 displayed on liquid crystal monitor 163 in FIG. 4, and part (b) of FIG. 9 is a view illustrating an icon indicating remaining electric energy of auxiliary battery 202 displayed on liquid crystal monitor 163 in FIG. 4.

Part (a) of FIG. 9 illustrates an icon indicating the remaining electric energy of main battery 201 displayed on liquid crystal monitor 163. Part (b) of FIG. 9 illustrates an icon indicating the remaining electric energy of auxiliary battery 202 displayed on liquid crystal monitor 163. The icon in part (a) of FIG. 9 is displayed on liquid crystal monitor 163 when the electric power is supplied from main battery 201 to the load circuit of each unit of camera system 100. On the other hand, the icon in part (b) of FIG. 9 is displayed on liquid crystal monitor 163 when the electric power is supplied from auxiliary battery 202 to the load circuit of each unit of camera system 100. The user can learn the battery in use and the remaining electric energy of the battery using the icons in part (a) of FIG. 9 and part (b) of FIG. 9.

Control processing in which camera controller 153 causes main battery 201 or auxiliary battery 202 to supply the electric power to the load circuit of each unit of camera system 100 will be described below.

Figure 10:
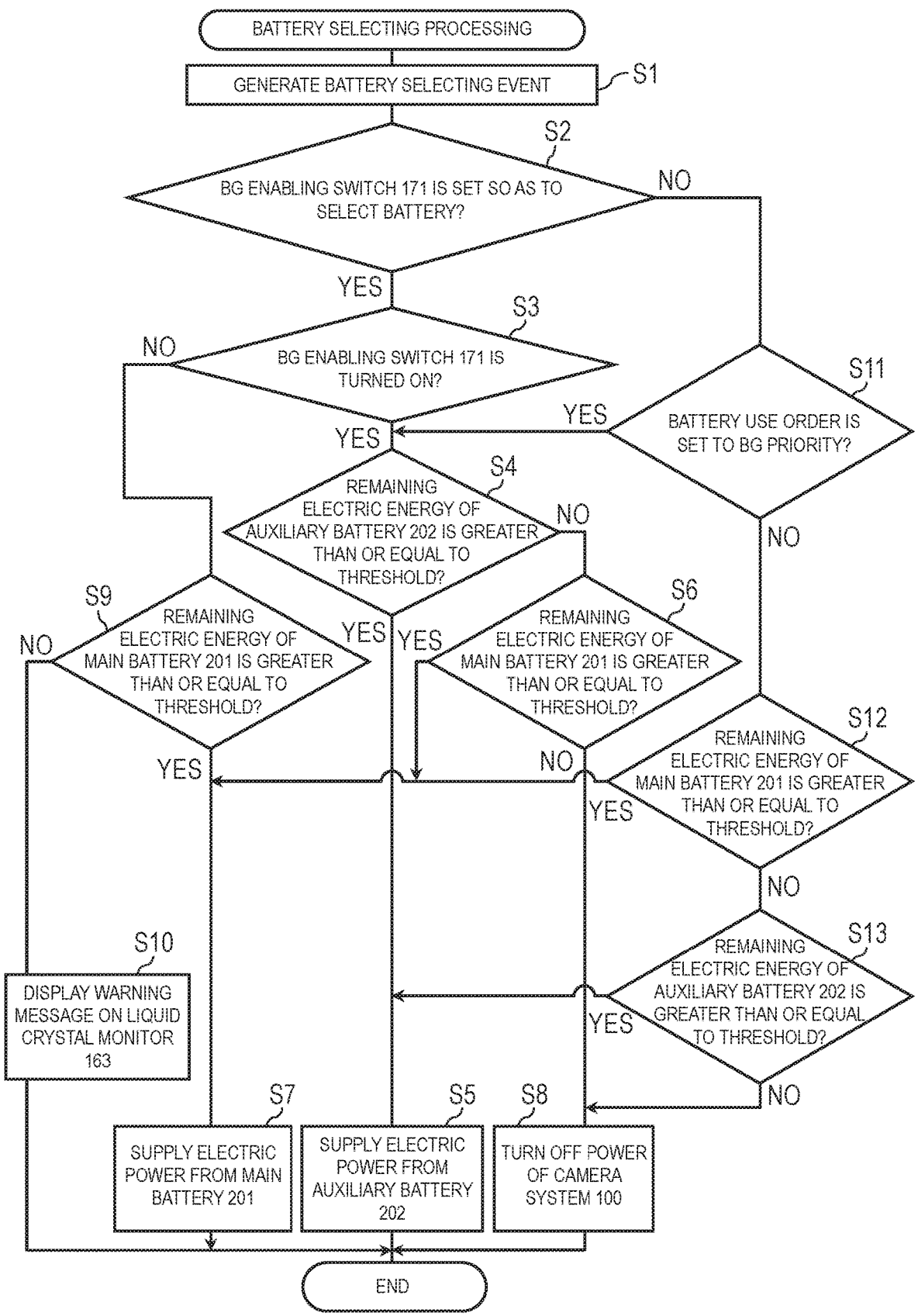
FIG. 10 is a flowchart illustrating battery selecting processing performed by camera controller 153 in FIG. 4.

FIG. 10 is a flowchart illustrating battery selecting processing performed by camera controller 153.

In step S1, camera controller 153 detects generation of a battery selecting event. For example, the battery selecting event includes turning on of power switch 152 of main body device 102, operation of BG enabling switch 171, and attachment of auxiliary battery 202 to battery grip 103.

In step S2, camera controller 153 determines whether BG enabling switch 171 is set so as to select the battery in the setting menu. The processing goes to step S3 when an affirmative determination is made, and the processing goes to step S11 when a negative determination is made. In step S2, the affirmative determination is made in the first and second modes, and the negative determination is made in the third mode.

In step S3, camera controller 153 determines whether BG enabling switch 171 is turned on (an example of the second state). The processing goes to step S4 when the affirmative determination is made, and the processing goes to step S9 when the negative determination is made.

In step S4, camera controller 153 determines whether the remaining electric energy of auxiliary battery 202 is greater than or equal to a threshold. The processing goes to step S5 when the affirmative determination is made, and the processing goes to step S6 when the negative determination is made.

In step S5, camera controller 153 supplies the electric power from auxiliary battery 202 to the load circuit of each unit of camera system 100. Camera controller 153 displays the icon in part (b) of FIG. 9 on liquid crystal monitor 163.

In step S6, camera controller 153 determines whether the remaining electric energy of main battery 201 is greater than or equal to a threshold. The processing goes to step S7 when the affirmative determination is made, and the processing goes to step S8 when the negative determination is made.

In step S7, camera controller 153 supplies the electric power from main battery 201 to the load circuit of each unit of camera system 100. Camera controller 153 displays the icon in part (a) of FIG. 9 on liquid crystal monitor 163.

In step S8, camera controller 153 turns off the power of camera system 100.

In step S9, camera controller 153 determines whether the remaining electric energy of main battery 201 is greater than or equal to the threshold. The processing goes to step S7 when the affirmative determination is made, and the processing goes to step S10 when the negative determination is made.

In step S10, camera controller 153 outputs warning information, and displays a warning message on liquid crystal monitor 163. For example, the warning message may be a message such as "the action is stopped when the auxiliary battery is taken out". The warning message may be displayed on other display devices (such as a Light Emitting Diode (LED)) instead of liquid crystal monitor 163. The warning information is output to a speaker, and the speaker may output the warning message by sound.

In step S11, camera controller 153 determines whether the battery use order is set to "BG priority". The processing goes to step S4 when the affirmative determination is made in step S3, and the processing goes to step S12 when the negative determination is made.

In step S12, camera controller 153 determines whether the remaining electric energy of main battery 201 is greater than or equal to the threshold. The processing goes to step S7 when the affirmative determination is made, and the processing goes to step S13 when the negative determination is made.

In step S13, camera controller 153 determines whether the remaining electric energy of auxiliary battery 202 is greater than or equal to the threshold. The processing goes to step S5 when the affirmative determination is made, and the processing goes to step S8 when the negative determination is made.

In the battery selecting processing of FIG. 10, when taking out auxiliary battery 202 from battery grip 103, the user operates only BG enabling switch 171 (for example, turns off BG enabling switch 171) without operating the setting menu of liquid crystal monitor 163, whereby the determination in step S3 becomes negative. That is, the user operates only BG enabling switch 171 without operating the setting menu of liquid crystal monitor 163, which allows main battery 201 to be preferentially selected as a supply source of the electric power to the load circuit of camera system 100 as compared with auxiliary battery 202.

In the battery selecting processing of FIG. 10, when attaching auxiliary battery 202 to battery grip 103, the user operates only BG enabling switch 171 (for example, turns on BG enabling switch 171) without operating the setting menu of liquid crystal monitor 163, whereby the determination in step S3 becomes affirmative. That is, the user operates only BG enabling switch 171 without operating the setting menu of liquid crystal monitor 163, which allows auxiliary battery 202 to be preferentially selected as the supply source of the electric power to the load circuit of camera system 100 as compared with main battery 201.

Camera controller 153 also switches between main battery 201 and auxiliary battery 202 based on the remaining electric energy of main battery 201 and auxiliary battery 202. That is, even if auxiliary battery 202 is preferentially selected, main battery 201 is selected in the case that auxiliary battery 202 has the small remaining electric energy. Main battery 201 is used in the case that the remaining electric energy of main battery 201 is greater than or equal to the threshold. Thus, the supply of the electric power to camera system 100 is hardly interrupted. In the first exemplary embodiment, the interruption of the supply of the electric power can be prevented by the simpler operation than before in switching the battery.

[1-3. Effect]

Main body device 102 and camera system 100 of the first exemplary embodiment has the following configuration.

Main body device 102 of the first exemplary embodiment includes main battery 201. Battery grip 103 including auxiliary battery 202 is detachably attached to main body device 102.

Main body device 102 includes load circuit (image processing circuit 172 and the like) and camera controller 153. Load circuit activates main body device 102. Camera controller 153 selects one of main battery 201 and auxiliary battery 202, and causes selected one to supply the electric power to the load circuit.

Camera controller 153 detects which state of BG enabling switch 171 is turned off (an example of the first state) or on (an example of the second state). BG enabling switch 171 is provided in one of main body device 102 and back grip 103.

When BG enabling switch 171 is in the first state (that is, NO in step S3 of FIG. 10), camera controller 153 preferentially selects main battery 201 as the supply source of the electric power to the load circuit as compared with auxiliary battery 202.

Consequently, the user operates BG enabling switch 171, which allows the supply source of the electric power to main body device 102 to be hardly interrupted even if auxiliary battery 202 of battery grip 103 is taken out. That is, in switching the battery, the interruption of the supply of the electric power can be prevented by the simpler operation than before.

Main body device 102 of the first exemplary embodiment may further include watt-hour meter 301a that acquires a first measurement value corresponding to the remaining electric energy of the main battery. In this case, when BG enabling switch 171 is in the first state (that is, NO in step S3 of FIG. 10), and when the first measurement value is greater than or equal to a predetermined threshold (YES in step S9), camera controller 153 may preferentially select main battery 201 as the supply source of the electric power to the load circuit as compared with auxiliary battery 202. By considering the measurement value of the remaining electric energy of main battery 201, the interruption of the supply of the electric power can be prevented by the simpler operation than before in switching the battery.

In main body device 102 of the first exemplary embodiment, BG enabling switch 171 may be provided in battery grip 103. This enables the improvement of operability of the user.

In main body device 102 of the first exemplary embodiment, BG enabling switch 171 may be configured to switch between the first state and the second state by one-hierarchy operation of the user. A turn of a lever, pressing down of a button, a turn of a dial, and one-time touch operation of a touch panel can be cited as the one-hierarchy operation. This enables the improvement of operability of the user.

Main body device 102 or battery grip 103 of the first exemplary embodiment may further include watt-hour meter 301b. Watt-hour meter 301b acquires a second measurement value corresponding to the remaining electric energy of auxiliary battery 202. In this case, camera controller 153 causes auxiliary battery 202 to supply the electric power to the load circuit when the switch is determined as in the second state (that is, YES in step S3 of FIG. 10), and when the second measurement value is determined as greater than or equal to the threshold (that is, YES in step S4).

As described above, by considering the state of BG enabling switch 171 and the measurement value of the remaining electric energy of auxiliary battery 202, the supply of the electric power from auxiliary battery 202 of battery grip 103 to the load circuit can be started by the simpler operation than before.

Main body device 102 of the first exemplary embodiment may further include liquid crystal monitor 163 that outputs the warning message. In this case, camera controller 153 displays the warning message on liquid crystal monitor 163 when the switch is detected to be changed from second state to the first state (NO in step S3 of FIG. 10), and when the first measurement value is determined as less than the threshold (NO in step S9).

Consequently, user's attention is attracted, and the interruption of the supply of the electric power is hardly generated.

In main body device 102 of the first exemplary embodiment, auxiliary battery 202 may detachably be attached to battery grip 103.

Consequently, camera system 100 can be activated for a long stretch of time

In main body device 102 of the first exemplary embodiment, battery grip 103 may further include operation unit 170. Operation unit 170 has a function of operating main body device 102. In this case, BG enabling switch 171 disables the function of operation unit 170 in the first state (NO in step S3), and enables the function of operation unit 170 in the second state (YES in step S3).

Consequently, the above effect can be obtained using existing switch, button, and the like of camera system 100.

Main body device 102 of the first exemplary embodiment may have the first mode and the second mode. In this case, when main body device 102 is in the first mode, the function of operation unit 170 may be disabled or enabled according to the state of BG enabling switch 171. When main body device 102 is in the second mode, the validity of invalidity of the function of operation unit 170 may not be changed according to the state of BG enabling switch 171.

Consequently, the user can simultaneously or independently set the function of operation unit 170 of battery grip 103 and the preferentially-used battery by operating BG enabling switch 171.

In main body device 102 of the first exemplary embodiment, main body device 102 may be an imaging device including CMOS image sensor 150 and image processing circuit 172.

Consequently, the first exemplary embodiment of the present disclosure can be applied to camera system 100.

Camera system 100 of the first exemplary embodiment includes main body device 102 and battery grip 103 including auxiliary battery 202.

Consequently, camera system 100 that can capture the image for a long stretch of time can be provided.

2. Second Exemplary Embodiment

A camera system according to a second exemplary embodiment will be described below with reference to FIGS. 11 to 13.

[2-1. Configuration]

Figure 11:
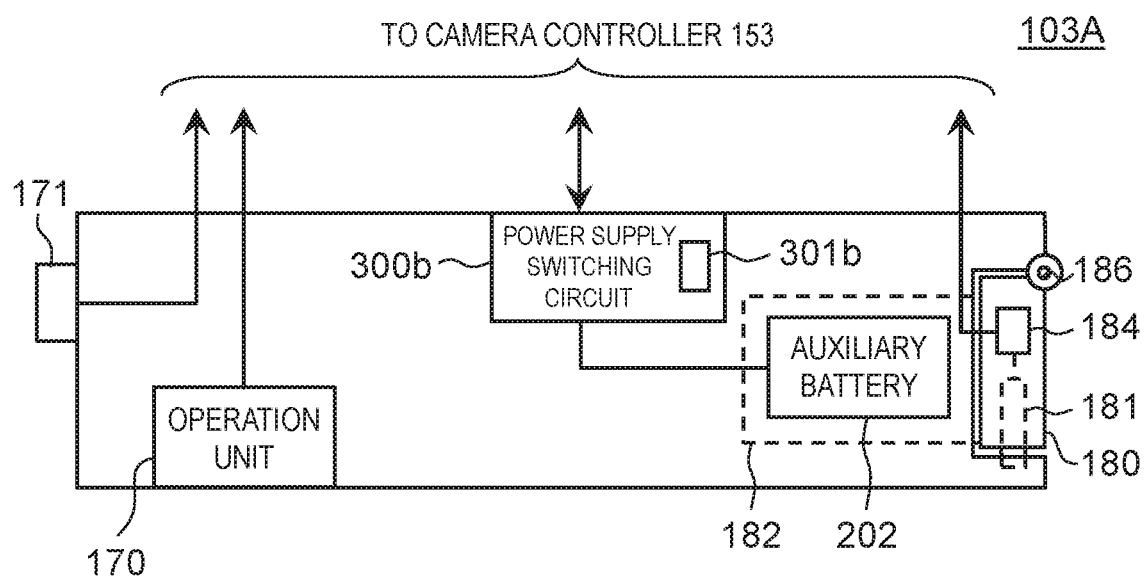
FIG. 11 is a block diagram illustrating a configuration of battery grip 103A of a camera system according to a second exemplary embodiment.

FIG. 11 is a block diagram illustrating a configuration of battery grip 103A of the camera system of the second exemplary embodiment. FIG. 11 illustrates battery door 180, lock lever 181, and accommodation chamber 182 (see FIG. 3), which are omitted in FIG. 4, in addition to the components in FIG. 4. Battery grip 103A further includes switch 184 that is linked with lock lever 181. When lock lever 181 releases auxiliary battery 202 from battery grip 103A, switch 184 is turned off to become the first state of the present disclosure. When lock lever 181 fixes auxiliary battery 202 to battery grip 103A, switch 184 is turned off to become the second state of the present disclosure.

In the second exemplary embodiment, the configuration of main body device 102 is similar to that of the first exemplary embodiment except that camera controller 153 detects the state of switch 184.

In the second exemplary embodiment, in order to set the preferentially-used battery, camera controller 153 considers the state of switch 184 instead of the state of BG enabling switch 171.

[2-2. Action]

Figure 12:
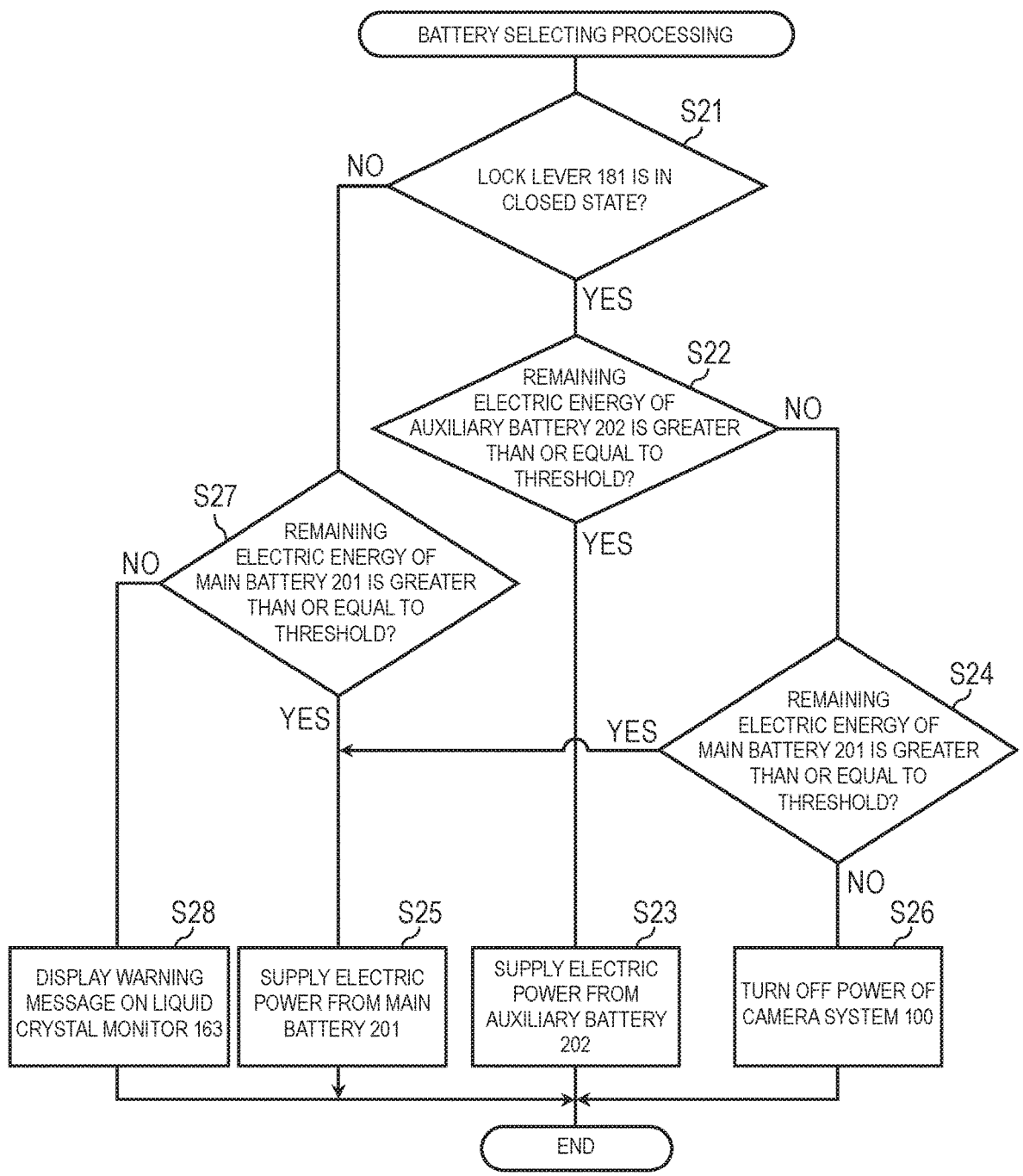
FIG. 12 is a flowchart illustrating battery selecting processing performed by a camera controller of the camera system of the second exemplary embodiment.

FIG. 12 is a flowchart illustrating the battery selecting processing performed by a camera controller of the camera system of the second exemplary embodiment. In step S21, camera controller 153 determines whether lock lever 181 is in a closed state (that is, whether switch 184 is turned on). The processing goes to step S22 when the negative determination is made, and the processing goes to step S27 when the affirmative determination is made. Steps S22 to S28 are similar to steps S4 to S10 in FIG. 10.

In the battery selecting processing of FIG. 12, when taking out auxiliary battery 202 from battery grip 103A, the user operates only lock lever 181 to "open" without operating the setting menu, whereby switch 184 is linked and turned off. The electric power can be supplied from main battery 201 to the load circuit of each unit of camera system 100. In the battery selecting processing of FIG. 10, when attaching auxiliary battery 202 to battery grip 103A, the user operates only lock lever 181 to "closed" without operating the setting menu, whereby switch 184 is linked and turned on. Thus, the electric power can preferentially be supplied from auxiliary battery 202 to the load circuit of each unit of camera system 100. Camera controller 153 switches between main battery 201 and auxiliary battery 202 based on the remaining electric energy of main battery 201 and auxiliary battery 202, so that the interruption of the supply of the electric power is hardly generated. Thus, in switching the battery, the interruption of the supply of the electric power can be prevented by the simpler operation than before.

[2-3. Modification]

Figure 13:
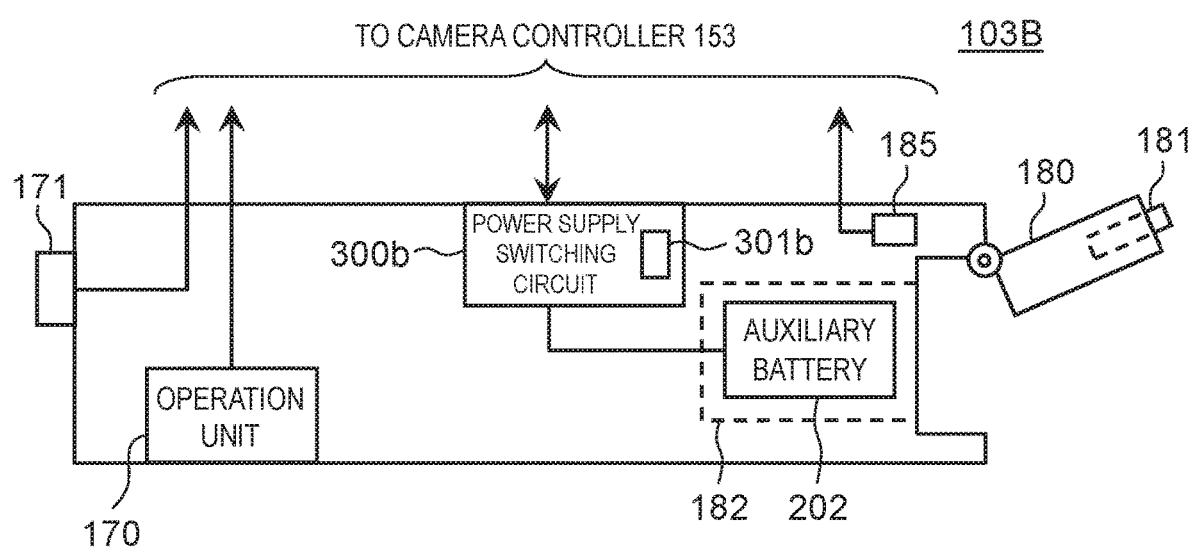
FIG. 13 is a block diagram illustrating a configuration of battery grip 103B of a camera system according to a modification of the second exemplary embodiment.

FIG. 13 is a block diagram illustrating a configuration of battery grip 103B of a camera system according to a modification of the second exemplary embodiment. Battery grip 103B includes switch 185 that is linked with battery door 180 instead of switch 184 in FIG. 11. When battery door 180 is closed, switch 185 is turned on to become the second state of the present disclosure. When battery door 180 is open, switch 185 is turned off to become the first state of the present disclosure. In the case that camera system includes battery grip 103B in FIG. 13, camera controller 153 also performs the battery selecting processing in FIG. 12. However, in step S21, camera controller 153 determines whether battery door 180 is in the closed state instead of whether lock lever 181 is in the closed state.

[2-4. Effect]

Main body device 102 of the second exemplary embodiment has the following configuration.

In main body device 102 of the second exemplary embodiment, battery grip 103A may further include lock lever 181. Lock lever 181 fixes or releases auxiliary battery 202 to and from battery grip 103A. In this case, switch 184 is in the first state when lock lever 181 releases auxiliary battery 202 from battery grip 103A, and switch 184 is in the second state when lock lever 181 fixes auxiliary battery 202 to battery grip 103A.

Consequently, the above effect can be obtained using existing switch and the like of camera system 100.

In main body device 102 of the second exemplary embodiment, battery grip 103B may further include accommodation chamber 182 that accommodates auxiliary battery 202 and battery door 180 that openably covers accommodation chamber 182. In this case, switch 185 is in the second state when battery door 180 is closed, and switch 185 is in the first state when battery door 180 is open.

Consequently, the above effect can be obtained using existing switch and the like of camera system 100.

3. Third Exemplary Embodiment

A camera system according to a third exemplary embodiment will be described below with reference to FIGS. 4, and 11 to 15. A basic configuration of the camera system of the third exemplary embodiment is similar to that of the camera system of the second exemplary embodiment. The camera system of the third exemplary embodiment describes the camera system of the present disclosure from a side different from the second exemplary embodiment.

[3-1. Configuration]

The camera system of the third exemplary embodiment includes the components in FIG. 4 similarly to the camera system of the second exemplary embodiment. The camera system of the third exemplary embodiment includes battery grip 103A in FIG. 11 similarly to the camera system of the second exemplary embodiment. Battery grip 103A includes battery door 180, lock lever 181, accommodation chamber 182, and switch 184.

Battery door 180 is attached to battery grip 103A so as to be rotatable around hinge shaft 186. Hinge shaft 186 is provided so as to pierce a torsion coil spring disposed between a bearing of battery door 180 and a bearing of battery grip 103A. The torsion coil spring is an example of the biasing member. When the user moves lock lever 181 to a position of "open" while battery door 180 is in the closed state, battery door 180 is automatically opened by repulsive force of the torsion coil spring. When battery door 180 is in the open state, the user can take out auxiliary battery 202 from accommodation chamber 182. The user can accommodate auxiliary battery 202 in accommodation chamber 182.

The user closes battery door 180 against the repulsive force of the torsion coil spring, and moves lock lever 181 to a position of "closed", whereby battery door 180 becomes the closed state. Auxiliary battery 202 is accommodated in accommodation chamber 182, battery door 180 is closed, and lock lever 181 is located at the position of "closed". At this point, taking out of auxiliary battery 202 from battery grip 103A is restricted.

In the third exemplary embodiment, similarly to the second exemplary embodiment, switch 184 is linked with lock lever 181. Switch 184 is turned off when lock lever 181 is located at the position of "open", and switch 184 is turned off when lock lever 181 is located at the position of "closed". Auxiliary battery 202 selects one of a "mounting state" and a "taking out proceeding state" with respect to battery grip 103A. Switch 184 functions as the state detector.

The taking out proceeding state is the state of auxiliary battery 202 when lock lever 181 is located at the position of "open". In the taking out proceeding state, auxiliary battery 202 is released from battery grip 103A. In the taking out proceeding state, switch 184 is turned off. The taking out proceeding state is the state of auxiliary battery 202 that transitions from the mounting state toward the taking out.

The mounting state is the state of auxiliary battery 202 when lock lever 181 is located at the position of "closed". In the mounting state, auxiliary battery 202 is fixed to battery grip 103A. In the mounting state, switch 184 is turned on.

Camera controller 153 can determined which state of auxiliary battery 202 is in the taking out proceeding state or the mounting state by detecting the on and off switching of switch 184.

The mounting state is the state of auxiliary battery 202 when battery door 180 is closed, and when lock lever 181 is located at the position of "closed". Thus, the mounting state may be the state in which the taking out of auxiliary battery 202 from battery grip 103A is restricted.

The taking out proceeding state is the state of auxiliary battery 202 when lock lever 181 is located at the position of "open". The taking out proceeding state may be the state in which the restriction is released in taking out auxiliary battery 202 from battery grip 103A. In the taking out proceeding state, the taking out restriction may completely be released or partially be released.

In the third exemplary embodiment, at least one of BG enabling switch 171 and setting menu receives user's selection whether main battery 201 or auxiliary battery 202 is preferentially used. Hereinafter, the mode in which auxiliary battery 202 is preferentially used is referred to as a BG priority mode (the extension device priority mode of the present disclosure).

[3-2. Action]

Figure 14:
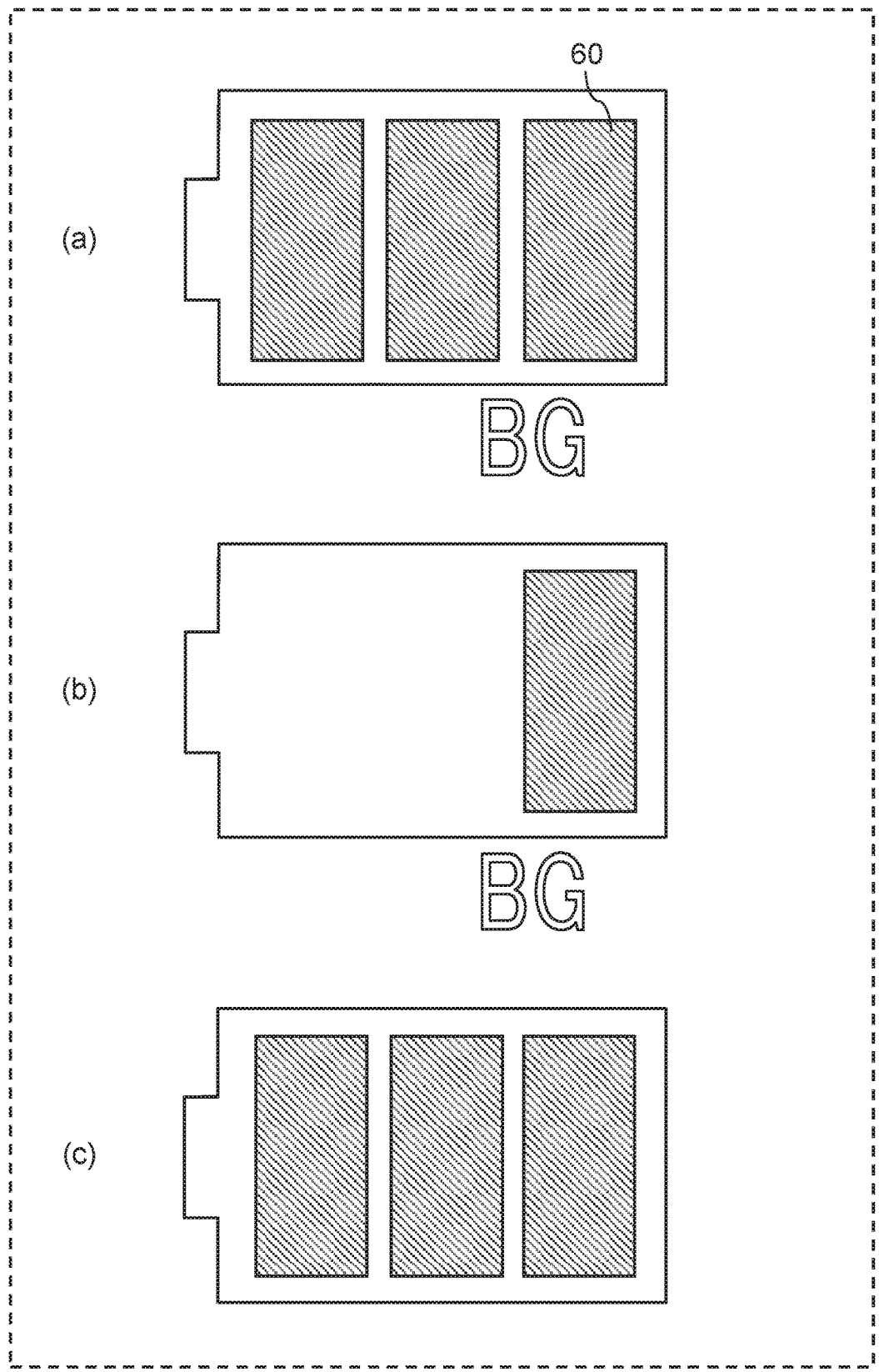
FIG. 14 is a view illustrating an icon displayed on liquid crystal monitor 163 of camera system 100 according to a third exemplary embodiment.

Battery switching action when the auxiliary battery is switched under the condition that the BG priority mode is set will be described with reference to FIGS. 14 and 15.

Figure 15:
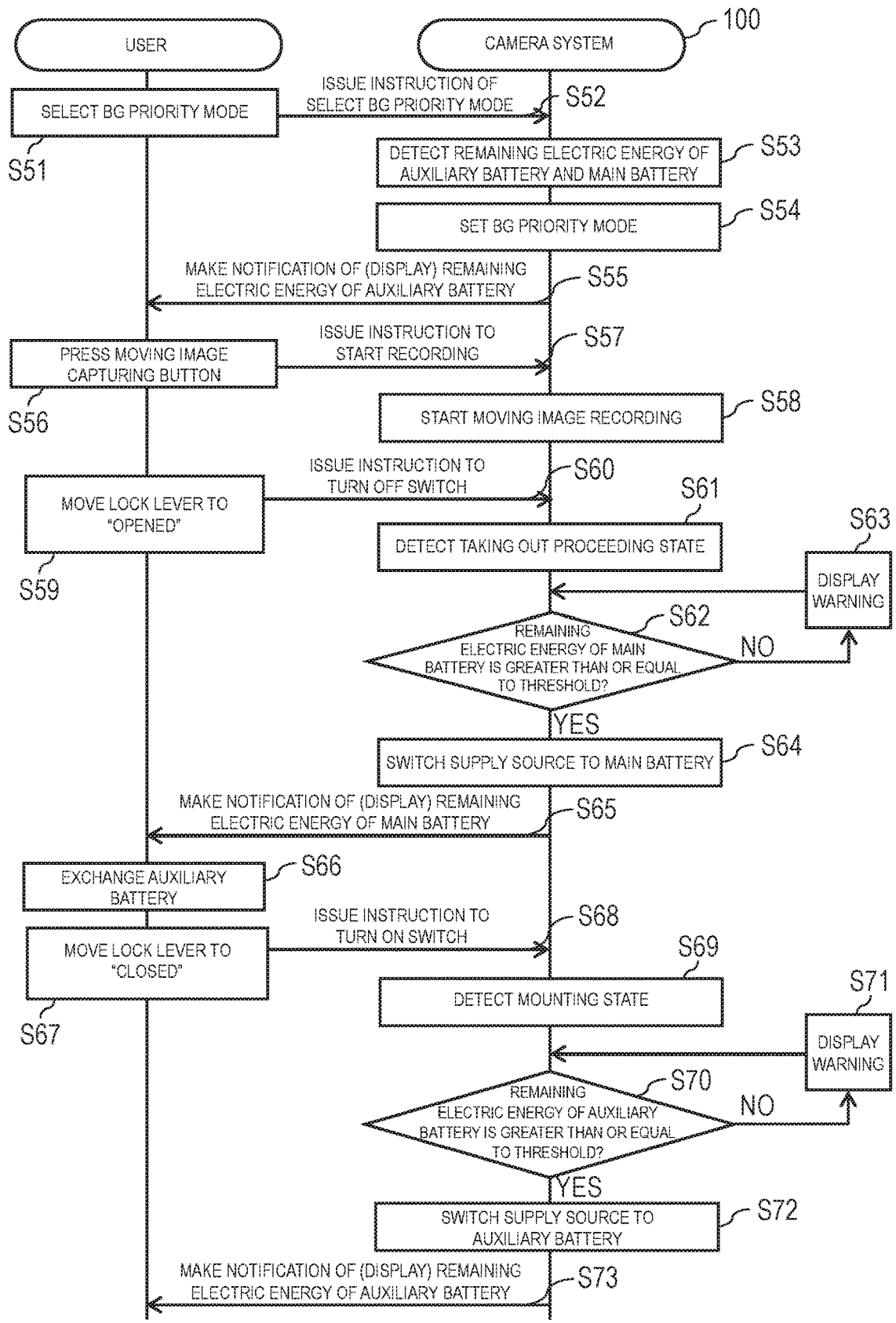
FIG. 15 is a sequence diagram of battery switching action of the third exemplary embodiment.

Before the flowchart in FIG. 15, the user mounts battery grip 103A on main body device 102. The user turns on power switch 152 of camera system 100.

Subsequently, the user operates at least one of BG enabling switch 171 and setting menu to select the BG priority mode (S51). Consequently, an instruction of the BG priority mode is input to camera system 100 (S52).

Camera controller 153 of camera system 100 detects the remaining electric energy (that is, remaining capacity of battery) of the auxiliary battery and the main battery using watt-hour meter 301b and watt-hour meter 301a (S53). For convenience, the processing is continued while the remaining electric energy of auxiliary battery 202 is regarded to be sufficient.

Camera controller 153 sets the BG priority mode (S54). That is, camera controller 153 gives the priority to auxiliary battery 202 as compared with main battery 201, and causes auxiliary battery 202 to supply the electric power to the load circuit of each unit of the camera system. When the BG priority mode is set, camera controller 153 displays the icon indicating the remaining capacity of battery in part (a) of FIG. 14 on liquid crystal monitor 163 (S55). The icon in part (a) of FIG. 14 includes three blocks 60. The remaining electric energy (that is, the remaining capacity of battery) is larger with increasing number of blocks 60. That is, the case that the number of blocks is three indicates the highest level of the remaining electric energy.

The user checks the icon displayed on liquid crystal monitor 163 to recognize the remaining capacity of battery, and presses down a moving image capturing button such as a release button (S56). Consequently, camera system 100 receives an instruction to start moving image recording (S57). Camera system 100 starts the moving image recording (S58).

When the high-resolution moving image is continuously captured even if auxiliary battery 202 is fully charged, sometimes the remaining electric energy runs out for about 30 minutes. For example, in the case that the remaining electric energy becomes small, the icon in part (b) of FIG. 14 is displayed on liquid crystal monitor 163.

The user exchanges auxiliary battery 202 for new auxiliary battery 202 when the remaining electric energy of auxiliary battery 202 becomes small. For this reason, the user sets lock lever 181 to the position of "open" to open battery door 180. When the user sets lock lever 181 to the position of "open", camera system 100 receives an instruction to turn off switch 184 (S60). When switch 184 is turned off, camera controller 153 of camera system 100 detects the "taking out proceeding state" of auxiliary battery 202 (S61).

Camera controller 153 determines whether the remaining capacity of battery of main battery 201 is greater than or equal to a predetermined threshold from a detection result of watt-hour meter 301a (S62). When the remaining capacity of battery of main battery 201 is less than the threshold (NO in S62), camera controller 153 displays the warning message on liquid crystal monitor 163 (S63), and processing returns to step S62. When the remaining capacity of battery of main battery 201 is greater than or equal to the threshold (YES in S62), camera controller 153 switches the supply source of the electric power to the load circuit from auxiliary battery 202 to main battery 201 while maintaining the BG priority mode (S64).

Camera controller 153 displays the remaining capacity of battery of main battery 201 on liquid crystal monitor 163 (S65). For example, the icon in FIG. 14(c) is displayed on liquid crystal monitor 163. The icon in FIG. 14(c) indicates that main battery 201 is sufficiently charged. Because characters BG are not added to the icon, the user can recognize that the currently-used battery is main battery 201.

The user exchanges auxiliary battery 202 for another charged auxiliary battery 202 (S66). The user closes battery door 180, and sets lock lever 181 to the position of "closed" (S67). When the user sets lock lever 181 to the position of "closed", camera system 100 receives an instruction to turn on switch 184 (S68). When switch 184 is turned on, camera controller 153 of camera system 100 detects the "mounting state" of that auxiliary battery 202 (S69).

Camera controller 153 determines whether the remaining capacity of battery of auxiliary battery 202 is greater than or equal to a predetermined threshold from a detection result of watt-hour meter 301b (S70). When the remaining capacity of battery of auxiliary battery 202 is less than the threshold (NO in S70), camera controller 153 displays the warning message on liquid crystal monitor 163 (S71), and processing returns to step S70. When the remaining capacity of battery of auxiliary battery 202 is greater than or equal to the threshold (YES in S70), camera controller 153 switches the supply source of the electric power to the load circuit from main battery 201 to auxiliary battery 202 (S72).

Camera controller 153 displays the remaining capacity of battery of auxiliary battery 202 on liquid crystal monitor 163 (S73). In the case that auxiliary battery 202 exchanged in step S66 is fully charged, for example, the icon in part (a) of FIG. 14 is displayed on liquid crystal monitor 163.

As described above, in the third exemplary embodiment, before auxiliary battery 202 is taken out, auxiliary battery 202 is automatically changed to main battery 201 according to the user's operation of lock lever 181 under the condition that the BG priority mode is set.

[3-3. Effect]

A background in which the BG priority mode is used in the third exemplary embodiment will be described below. Typically various interfaces such as an operation unit, a monitor, and an connection terminal are disposed on a side surface and a top surface of main body device 102. Thus, there is a few free space on the side surface and the top surface of main body device 102. For this reason, a taking out port of main battery 201 and a connection unit of battery grip 103A are frequently disposed on a bottom surface of main body device 102. As a result, the taking out port of main battery 201 is closed when battery grip 103A is mounted on main body device 102. Thus, the use cannot take out main battery 201. For this reason, using the BG priority mode, the user causes camera system 100 to preferentially use auxiliary battery 202 inserted in battery grip 103A. In the case that the remaining electric energy of auxiliary battery 202 is decreased, auxiliary battery 202 is exchanged for fully-charged auxiliary battery 202. This enables the user to smoothly continue the image capturing Thus, the BG priority mode in which auxiliary battery 202 is preferentially used is used in the third exemplary embodiment.

A conventional problem during the use of the BG priority mode will specifically be described. Conventionally, main battery 201 is not used as long as the mode is switched to the mode in which main battery 201 is preferentially used. Thus, when auxiliary battery 202 is taken out under the condition that the BG priority mode is set, there is a problem in that the power supply is turned off to stop the image capturing. The problem particularly becomes conspicuous during the capturing of the moving image. In the case that the user captures the still image, the user easily decides timing of changing the battery, and the battery is rarely switched during the image capturing. Because the user can switch the battery after the image capturing, the image capturing interruption that is not intended by the user is hardly generated. However, an image capturing period of the moving image is relatively long, the user frequently switches the battery during the image capturing. When the image capturing is interrupted during the capturing of the moving image, the user cannot record the desired moving image.

Based on the above background and problem, the third exemplary embodiment is main body device 102 (an example of the electronic device) including main battery 201 (an example of the first battery). Main body device 102 is configured such that battery grip 103A (an example of the extension device) including auxiliary battery 202 (an example of the second battery) is detachably attached to main body device 102. Main body device 102 is configured to communicate with switch 184 (an example of the state detector) that detects the state of auxiliary battery 202.

Auxiliary battery 202 has the mounting state in which auxiliary battery 202 is mounted on battery grip 103A and the taking out proceeding state in which auxiliary battery 202 transitions from the mounting state toward the taking out. Output of switch 184 indicates on output (an example of one state) in the mounting state, and indicates off output (an example of another state) in the taking out proceeding state.

Main body device 102 includes the load circuit that activates main body device 102. Main body device 102 includes camera controller 153 (an example of the control circuit) that selects one of main battery 201 and auxiliary battery 202 to cause selected one to supply the electric power to the load circuit.

Camera controller 153 detects which state of auxiliary battery 202 is in the mounting state or the taking out proceeding state based on the output of the switch.

When auxiliary battery 202 is detected to be in the taking out proceeding state while auxiliary battery 202 is preferentially used as compared with main battery 201 (for example, under the condition that the BG priority mode (an example of the extension device priority mode) is set), camera controller 153 preferentially selects main battery 201 as the supply source of the electric power to the load circuit as compared with auxiliary battery 202.

This enable the user to be prevented from taking out auxiliary battery 202 to unintentionally interrupt the image capturing even if the image capturing is currently performed using auxiliary battery 202.

When auxiliary battery 202 is in the mounting state, namely, when auxiliary battery 202 is mounted on battery grip 103A, the taking out of auxiliary battery 202 from battery grip 103A may be restricted by one or a plurality of restriction mechanisms (for example, battery door 180 and lock lever 181).

The mounting state is the state in which auxiliary battery 202 is mounted on battery grip 103A, or may be a state in which the taking out of auxiliary battery 202 from battery grip 103A is restricted by one or the plurality of restriction mechanisms (for example, battery door 180 and lock lever 181). The taking out proceeding state may be a state in which at least one (for example, lock lever 181) of the plurality of restriction mechanisms is released.

Main body device 102 may further include watt-hour meter 301a (an example of the first detector) that acquires the first measurement value corresponding to the remaining electric energy of main battery 201.

Under the condition that the BG priority mode is set, when the auxiliary battery is in the taking out proceeding state, and when the first measurement value is greater than or equal to a predetermined threshold (YES in S62 of FIG. 15), camera controller 153 may preferentially select main battery 201 as the supply source of the electric power to the load circuit as compared with auxiliary battery 202 (S64 in FIG. 15).

Consequently, the user can be prevented from switching the battery to be used to main battery 201 irrespective of the small remaining electric energy of main battery 201.

Under the condition that the BG priority mode is set, when auxiliary battery 202 transitions to the mounting state again after becoming the released state, camera controller 153 may preferentially select auxiliary battery 202 as the supply source of the electric power to the load circuit as compared with main battery 201 (S72 in FIG. 15).

Consequently, the user can return the battery to be used to auxiliary battery 202 without setting the switching of the battery.

The third exemplary embodiment discloses a method for switching the battery that main body device 102 (an example of the electronic device) uses as the supply source of the electric power.

Main body device 102 includes main battery 201 (an example of the first battery). Battery grip 103A (an example of the extension device) including auxiliary battery 202 (an example of the second battery) is detachably attached to main body device 102. Main body device 102 is configured to communicate with switch 184 (an example of the state detector) that detects the state of auxiliary battery 202.

Auxiliary battery 202 has the mounting state in which auxiliary battery 202 is mounted on battery grip 103A and the taking out proceeding state in which auxiliary battery 202 transitions toward the taking out from battery grip 103A.

The output of switch 184 indicates the on output (an example of one state) in the mounting state. The output of switch 184 indicates the off output (an example of another state) in the taking out proceeding state.

In the battery switching method, which state of auxiliary battery 202 is in the mounting state or the taking out proceeding state is detected while auxiliary battery 202 is preferentially used as compared with main battery 201 (under the condition that the BG priority mode (an example of the extension device priority mode) is set). The mounting state is the state in which auxiliary battery 202 is mounted on battery grip 103A, or may be a state in which the taking out of auxiliary battery 202 from battery grip 103A is restricted by one or the plurality of restriction mechanisms (for example, battery door 180 and lock lever 181). The taking out proceeding state is the state in which the taking out of auxiliary battery 202 from battery grip 103A is proceeding, or may be the state in which at least one (for example, lock lever 181) of the plurality of restriction mechanisms is released.

When auxiliary battery 202 is detected to be in the taking out proceeding state, main battery 201 is preferentially used as compared with auxiliary battery 202.

This enable the user to be prevented from taking out auxiliary battery 202 to unintentionally interrupt the image capturing even if the image capturing is currently performed using auxiliary battery 202.

In the battery switching method, under the condition that the BG priority mode is set, when auxiliary battery 202 transitions to the mounting state again after becoming the taking out proceeding state, auxiliary battery 202 may preferentially be used as compared with main battery 201.

Consequently, the user can return the battery to be used to auxiliary battery 202 without setting the switching of the battery.

[3-4. Modifications]

Modifications of the third exemplary embodiment will be described below with reference to FIG. 16. In the third exemplary embodiment, battery door 180 and lock lever 181 are cited as the restriction mechanism. The mounting state is the state in which battery door 180 is closed while lock lever 181 is located at the position of "closed". The taking out proceeding state is the state in which lock lever 181 is located at the position of "open". In the taking out proceeding state, because the lock lever is located at the position of "open" to open battery door 180, the taking out proceeding state is the state in which battery door 180 is also open. Switch 184 is cited as the state detector that detects the mounting state and the taking out proceeding state. Modifications of these configurations will be described below.

(1) In a first modification, the restriction mechanism and the state detector have configurations similar to those of the third exemplary embodiment. The mounting state and the taking out proceeding state are also similar to those of the third exemplary embodiment. However, in the third exemplary embodiment, when lock lever 181 is located at the position of "open", battery door 180 is automatically opened by the repulsive force of the torsion coil spring. Alternatively, battery door 180 may be opened by not a mechanical unit but an electric unit. That is, when lock lever 181 moves to the position of "open", camera controller 153 may perform the control such that battery door 180 is opened.

(2) In a second modification, the restriction mechanism and the state detector have configurations similar to those of the third exemplary embodiment. The mounting state is also similar to that of the third exemplary embodiment. However, the taking out proceeding state is different from that of the third exemplary embodiment.

In the second modification, battery door 180 is a manually-opened door. The manually-opened door includes a slide type door and a door that is opened by pushing. That is, after moving lock lever 181 to the position of "open", the user may open battery door 180 by operation to slide or push battery door 180. Even in this case, the restriction mechanism is battery door 180 and lock lever 181. In the second modification, battery door 180 is closed, and the lock lever 181 is located at the position of "closed", whereby auxiliary battery 202 becomes the mounting state. However, in the second modification, lock lever 181 is located at the position of "open" irrespective of the opening and closing of battery door 180, whereby auxiliary battery 202 becomes the taking out proceeding state. In the second modification, switch 184 detects the opening and closing of lock lever 181. However, the opening and closing of lock lever 181 may be detected by a sensor (to be described later).

(3) In a third modification, the restriction mechanism may not include battery door 180. The restriction mechanism may be a stopper such as a claw, a protrusion, and a bar instead of lock lever 181. That is, the restriction mechanism may be a unit that mechanically prevents auxiliary battery 202 from dropping from accommodation chamber 182. In the third modification, the state detector may be a switch or a sensor. Even in the third modification, the mounting state is an engagement state in which auxiliary battery 202 is not taken out from accommodation chamber 182 by the restriction mechanism. The taking out proceeding state is a state in which taking out restriction by the restriction mechanism is released. Camera controller 153 may determine the mounting state and the taking out proceeding state by the action of the restriction mechanism or the position of auxiliary battery 202.

The case that auxiliary battery 202 is taken out from accommodation chamber 182 by a push-pull system will be described as a specific example of the third modification with reference to FIG. 16. The restriction mechanism is a claw. The claw is disposed in accommodation chamber 182. The claw is stored outside accommodation chamber 182 when pressed, and the claw protrudes inside accommodation chamber 182 when pressure is not applied to the claw. The claw protrudes when auxiliary battery 202 is mounted on accommodation chamber 182, namely, auxiliary battery 202 is in the mounting state. The claw is engaged with auxiliary battery 202, and the taking out of auxiliary battery 202 is restricted. When auxiliary battery 202 is further pushed inward, the claw is disengaged from auxiliary battery 202 (that is, the engagement of the claw is released), and auxiliary battery 202 becomes the taking out proceeding state. Auxiliary battery 202 in the taking out proceeding state is taken out. In this case, the state detector may be a switch linked with the claw. Alternatively, the state detector may be a switch that contacts with auxiliary battery 202 to switch between on and off when auxiliary battery 202 is pushed into accommodation chamber 182. Alternatively, the state detector may be a switch that detects the position of auxiliary battery 202. The sensor and the like will be described later.

(4) In a fourth modification, the restriction mechanism is battery door 180, but does not include lock lever 181. The state detector may be switch 185 similarly to the modification of the second exemplary embodiment in FIG. 13. Alternatively, the state detector may be a sensor (to be described later). In the fourth modification, the mounting state is a state in which battery door 180 is closed. The taking out proceeding state is a state in which battery door 180 is open. The state in which battery door 180 is open is not the state in which battery door 180 is completely open, but the state in which battery door 180 is rotated by an angle greater than or equal to a predetermined angle. The state in which battery door 180 is open may be the state in which battery door 180 is open such that a gap greater than or equal to a predetermined is obtained. Switch 185 may be turned on when battery door 180 is closed, and switch 185 may be turned off when battery door 180 is open.

(5) In a fifth modification, the restriction mechanism includes battery door 180 and lock lever 181 similarly to the third exemplary embodiment. In the fifth modification, the state detector is a switch (for example, switch 185 in FIG. 13) that detects the opening and closing of battery door 180 or a sensor and the like (to be described later). In the fifth modification, although the restriction mechanism includes lock lever 181, the action of lock lever 181 is not linked with the determination of the mounting state and the taking out proceeding state.

For example, in the case that the state detector is switch 185, switch 185 may be turned off when battery door 180 is open, and switch 185 may be turned on when battery door 180 is closed. Camera controller 153 determines that auxiliary battery 202 is in the mounting state when switch 185 is turned on, and camera controller 153 determines that auxiliary battery 202 is in the taking out proceeding state when switch 185 is turned off. That is, camera controller 153 distinguishes the mounting state and the taking out from each other according to not the state of lock lever 181 but the opening and closing of battery door 180.

(6) Configurations except for switches 184, 185 will be described below as a modification of the state detector. For example, the state detector may be one of an IR sensor, a laser device, a magnetic resistance sensor, and a photodetection sensor. Each example will be described below.

(a) In the case that the state detector is the IR sensor, the IR sensor may be disposed around an opening of battery door 180 or accommodation chamber 182. The IR sensor outputs infrared light, and reflected light is input to the IR sensor. The opening of battery door 180 differs from the closing of battery door 180 in time in which a reflected wave is required to be returned. For example, in the case that the detection result of the IR sensor indicates time that is greater than or equal to a predetermined threshold, battery door 180 may be determined as open. Thus, camera controller 153 can detect whether auxiliary battery 202 is in the mounting state or the taking out proceeding state based on the detection result of the IR sensor. In this case, even if battery door 180 includes lock lever 181, whether auxiliary battery 202 is in the mounting state or the taking out proceeding state may not be changed with the action of lock lever 181.

The IR sensor may be disposed in accommodation chamber 182. The IR sensor measures a distance to auxiliary battery 202. Thus, camera controller 153 can detect whether auxiliary battery 202 is in the mounting state or the taking out proceeding state based on the detection result of the IR sensor.

(b) Although the case that the state detector is the laser device differs from the case that the state detector is the IR sensor in a light source, a principle almost similar to that of the state detector is the IR sensor in a light source is used in the case that the state detector is the laser device. That is, laser light may be used instead of the infrared light. Camera controller 153 can detect whether auxiliary battery 202 is in the mounting state or the taking out proceeding state using a reflection time of the laser light.

(c) In the case that the state detector is the magnetic resistance sensor, the magnetic resistance sensor may be provided around the opening of battery door 180 or accommodation chamber 182. Electric resistance detected by the magnetic resistance sensor changes by a change in magnetic field. Thus, camera controller 153 can detect whether auxiliary battery 202 is in the mounting state or the taking out proceeding state based on the detection result of the magnetic resistance sensor. In this case, even if battery door 180 includes lock lever 181, whether auxiliary battery 202 is in the mounting state or the taking out proceeding state may not be changed with the linking of the action of lock lever 181.

The magnetic resistance sensor may be provided in lock lever 181 or around lock lever 181. The detection result of the magnetic resistance sensor changes with the movement of lock lever 181. Thus, camera controller 153 can detect whether auxiliary battery 202 is in the mounting state or the taking out proceeding state based on the detection result of the magnetic resistance sensor. In this case, even if the restriction mechanism includes battery door 180, the determination of the mounting state or the taking out proceeding state may not be changed with the action of battery door 180.

(d) In the case that the state detector is the photodetection sensor, the photodetection sensor may be provided inside battery door 180 or in accommodation chamber 182. The photodetection sensor detects the light in accommodation chamber 182. Thus, camera controller 153 can detect the opening and closing of battery door 180 based on the detection result of the photodetection sensor. Alternatively, the photodetection sensor may detect a difference in light amount between the taking out of auxiliary battery 202 (that is, the taking out proceeding state) and the mounting of auxiliary battery 202 (that is, the mounting state) in accommodation chamber 182. In this case, camera controller 153 can detect the mounting state and the taking out proceeding state based on the detection result of the photodetection sensor.

(e) In the third exemplary embodiment, under the condition that the BG priority mode is set, when auxiliary battery 202 is in the taking out proceeding state (S61 in FIG. 15), the battery is switched to the main battery while the BG priority mode is maintained (S64 in FIG. 15). Consequently, the battery is switched to auxiliary battery 202 when auxiliary battery 202 transitions to the mounting state again (S69 in FIG. 15). However, when auxiliary battery 202 is in the taking out proceeding state under the condition that the BG priority mode is set, the mode may be switched to the main battery priority mode. In the main battery priority mode, main battery 201 is preferentially used as compared with auxiliary battery 202.

Other Exemplary Embodiments

The exemplary embodiments are described above as illustration of the technique disclosed in this application. However, the technique of the present disclosure is not limited to the exemplary embodiments, but can be applied to another exemplary embodiment in which a change, a replacement, an addition, or an omission is appropriately made. The components described in the exemplary embodiments can be combined to make a new exemplary embodiment.

In the present disclosure, main body device 102 is an example of the "electronic device". Battery grips 103, 103A, 103B are an example of the "extension device". Camera system 100 is an example of the "electronic system". Main battery 201 is an example of the "first battery". Auxiliary battery 202 is an example of the "second battery". Each unit of camera system 100 is an example of the "load circuit". Camera controller 153 is an example of the "control circuit". BG enabling switch 171, switches 184, 185 are an example of the "switch". Watt-hour meter 301a is an example of the "first detector". The measurement value measured by watt-hour meter 301a is an example of the "first measurement value". Watt-hour meter 301b is an example of the "second detector". The measurement value measured by watt-hour meter 301b is an example of the "second measurement value". Liquid crystal monitor 163 is an example of the "warning device".

BG enabling switch 171 and switches 184, 185 of the exemplary embodiments are disposed in battery grip 103. Alternatively, BG enabling switch 171 and switches 184, 185 may be disposed in main body device 102.

BG enabling switch 171 may be a push type switch, and includes various forms such as a lever, a dial, and a liquid crystal panel. In any form, BG enabling switch 171 is disposed in one of the electronic device and the extension device such that an operation surface is exposed, and the user can select the first state and the second state by a single operation during the image capturing.

In addition to the digital camera, the thought of the present disclosure can be applied to various electronic devices, such as a movie camera, a mobile phone with camera, and a personal computer, to which the plurality of batteries can be attached.

The exemplary embodiments have been described above for exemplifying the technique of the present disclosure. The accompanying drawings and the detailed description have been provided for that purpose.

Thus, in order to exemplify the above technique, the accompanying drawings and the detailed description include not only components that are essential for solving problems, but also components that are not essential for solving the problems. For this reason, it should not be construed that the component that are not essential are essential because the components are described in the appended drawings and the detailed description.

The above exemplary embodiments are used for exemplifying the technique of the present disclosure, so that various modifications, replacements, additions, and omissions can be made within the scope of the claims and their equivalents.

INDUSTRIAL APPLICABILITY

The present disclosure can be applied to electronic devices, such as a digital camera, a movie camera, a mobile phone with camera, and a personal computer, to which the plurality of batteries can be attached.

The invention claimed is:

1. An electronic device to which an extension device including a second battery is detachably coupled, the electronic device comprising:
   a first battery;
   a load circuit that activates the electronic device; and
   a control circuit that selects one of the first battery and the second battery and causes the selected one to supply electric power to the load circuit,
   wherein the control circuit
      detects, in a state in which the extension device is mounted on the electronic device, whether a switch provided in the extension device or the electronic device is in a first state or in a second state,
      prioritizes the first battery as a supply source of electric power to the load circuit as compared with the second battery when the switch is in the first state, and
      prioritizes the second battery as a supply source of electric power to the load circuit as compared with the first battery when the switch is in the second state, and
   wherein operation of the switch is independent of mounting or removal of the extension device on the electronic device, and
   the second battery, in a state in which the extension device is mounted on the electronic device, is provided detachably on the extension device.

2. The electronic device according to claim 1, further comprising a first detector that acquires a first measurement value corresponding to remaining electric energy of the first battery,
   wherein the control circuit prioritizes the first battery as the supply source of the electric power to the load circuit as compared with the second battery when (i) the switch is in the first state and (ii) the first measurement value is greater than or equal to a predetermined threshold.

3. The electronic device according to claim 1, wherein the switch is configured to switch between the first state and the second state by user's one-hierarchy operation.

4. The electronic device according to claim 1, wherein
   one of the electronic device and the extension device further includes a second detector that acquires a second measurement value corresponding to remaining electric energy of the second battery, and
   the control circuit causes the second battery to supply the electric power to the load circuit when (i) the switch is in the second state and (ii) the second measurement value is greater than or equal to a predetermined threshold.

5. The electronic device according to claim 2, further comprising a warning device that outputs warning information,
   wherein the control circuit causes the warning device to output the warning information when (i) a change of the switch from the second state to the first state is detected and (ii) the first measurement value is less than the predetermined threshold.

6. The electronic device according to claim 1, wherein the second battery is detachably coupled to the extension device.

7. The electronic device according to claim 6, wherein
   the extension device further includes a lock lever that fixes and releases the second battery to or from the extension device, and
   the switch is in the first state when the lock lever releases the second battery from the extension device, and the switch is in the second state when the lock lever fixes the second battery to the extension device.

8. The electronic device according to claim 6, wherein
   the extension device further includes: an accommodation chamber that accommodates the second battery; and a battery door that openably covers the accommodation chamber, and
   the switch is in the second state when the battery door is closed, and the switch is in the first state when the battery door is open.

9. The electronic device according to claim 1, wherein the electronic device is an imaging device including an image sensor and an image processing circuit.

10. An electronic system comprising:
    the electronic device according to claim 1; and
    the extension device including the second battery.

11. An electronic device to which an extension device including a second battery is detachably coupled, the electronic device comprising:
    a first battery;
    a load circuit that activates the electronic device; and
    a control circuit that selects one of the first battery and the second battery and causes the selected one to supply electric power to the load circuit,
    wherein the control circuit
       detects whether a switch provided in the extension device is in a first state or in a second state, and
       prioritizes the first battery as a supply source of electric power to the load circuit as compared with the second battery when the switch is in the first state, and
    wherein
    the extension device further includes an operation unit that operates the electronic device, and
    the control circuit sets invalidity of a function of the operation unit when the switch is in the first state, and sets validity of the function of the operation unit when the switch is in the second state.

12. The electronic device according to claim 11, wherein
    the electronic device has a first mode and a second mode,
    the control circuit switches between invalidity and validity of the function of the operation unit depending on whether the switch is in the first state or in the second state when the electronic device is in the first mode, and
    the control circuit does not switch between the invalidity and the validity of the function of the operation unit depending on whether the switch is in the first state or in the second state when the electronic device is in the second mode.

13. An electronic device to which an extension device including a second battery is detachably coupled, the electronic device communicating with a state detector that detects a state of the second battery, the second battery having a mounting state in which the second battery is mounted on the extension device and a taking out proceeding state in which the second battery transitions from the mounting state toward taking out in which the second battery may be removed from the extension device while the extension device remains coupled to the electronic device, an output of the state detector indicating one state when the second battery is in the mounting state, and indicating another state when the second battery is in the taking out proceeding state, the electronic device comprising:
  a first battery;
  a load circuit that activates the electronic device; and
  a control circuit that selects one of the first battery and the second battery and causes the selected one to supply electric power to the load circuit,
  wherein the control circuit detects whether the second battery is in the mounting state or in the taking out proceeding state based on the output of the state detector,
  the control circuit prioritizes the first battery as a supply source of the electric power to the load circuit as compared with the second battery when the control circuit detects that the second battery is in the taking out proceeding state while the second battery has priority as compared with the first battery, and
  the control circuit prioritizes the second battery as the supply source of the electric power to the load circuit as compared with the first battery when the second battery transitions to the mounting state again after becoming the taking out proceeding state while the extension device remains coupled to the electronic device.

14. The electronic device according to claim 13, further comprising a first detector that acquires a first measurement value corresponding to remaining electric energy of the first battery,
  wherein the control circuit prioritizes the first battery as the supply source of the electric power to the load circuit as compared with the second battery when (i) the second battery is in the taking out proceeding state and (ii) the first measurement value is greater than or equal to a predetermined threshold.

15. A method for switching a battery used in an electronic device, wherein
  the electronic device includes a first battery, an extension device including a second battery is detachably coupled to the electronic device, the electronic device communicates with a state detector that detects a state of the second battery, and
  the second battery has a mounting state in which the second battery is mounted on the extension device and a taking out proceeding state in which the second battery transitions from the mounting state toward taking out in which the second battery may be removed from the extension device while the extension device remains coupled to the electronic device,
  output of the state detector indicates one state when the second battery is in the mounting state, and indicates another state when the second battery is in the taking out proceeding state,
  the method comprising
  prioritizing using the first battery as compared with the second battery when it is detected that the second battery is in the taking out proceeding state while the second battery has priority as compared with the first battery, wherein
  the second battery has priority as compared with the first battery when the second battery transitions to the mounting state again after becoming the taking out proceeding state while the extension device remains coupled to the electronic device.

* * * * *